(12) United States Patent
Ish-Hurwitz et al.

(10) Patent No.: US 12,022,839 B2
(45) Date of Patent: Jul. 2, 2024

(54) L-SHAPED SMOKER BOXES FOR GAS GRILLS

(71) Applicant: Weber-Stephen Products LLC, Palatine, IL (US)

(72) Inventors: Rome Ish-Hurwitz, Chicago, IL (US); James Keclik, McHenry, IL (US); Douglas W. Masek, Palatine, IL (US)

(73) Assignee: Weber-Stephen Products LLC, Palatine, IL (US)

(*) Notice: Subject to any disclaimer, the term of this patent is extended or adjusted under 35 U.S.C. 154(b) by 447 days.

(21) Appl. No.: 17/472,339

(22) Filed: Sep. 10, 2021

(65) Prior Publication Data

US 2022/0338493 A1 Oct. 27, 2022

Related U.S. Application Data

(60) Provisional application No. 63/178,348, filed on Apr. 22, 2021.

(51) Int. Cl.
*A23B 4/052* (2006.01)
*A47J 37/07* (2006.01)

(52) U.S. Cl.
CPC .......... *A23B 4/052* (2013.01); *A47J 37/0704* (2013.01); *A47J 37/0786* (2013.01)

(58) Field of Classification Search
CPC ... A47J 37/0786; A47J 37/0713; A23B 4/052; A23B 4/044; A23B 4/0523
USPC .......................................... 99/482; 126/25 R
See application file for complete search history.

(56) References Cited

U.S. PATENT DOCUMENTS

| | | |
|---|---|---|
| 4,337,751 A | 7/1982 | Sampson et al. |
| 5,070,776 A | 12/1991 | Schlosser et al. |
| 6,102,028 A | 8/2000 | Schlosser et al. |
| 6,257,130 B1 * | 7/2001 | Schlosser ............ A47J 37/0713 126/41 R |
| 6,971,305 B1 | 12/2005 | Thomas |
| 7,703,386 B1 | 4/2010 | Bourgeois et al. |
| 7,757,604 B2 | 7/2010 | Gonzalez |
| 7,832,330 B1 | 11/2010 | Thompson |
| 7,866,256 B2 | 1/2011 | Frigo |
| 8,132,688 B2 | 3/2012 | Martin |
| 8,939,068 B2 | 1/2015 | Cohen |
| 8,997,639 B2 | 4/2015 | Adams et al. |
| 9,084,506 B2 | 7/2015 | Merritt |
| 9,179,799 B1 | 11/2015 | Bourgeois et al. |

(Continued)

FOREIGN PATENT DOCUMENTS

| | | |
|---|---|---|
| CA | 3108117 | 5/2020 |
| CN | 101218933 | 10/2011 |

(Continued)

OTHER PUBLICATIONS

Smokin Wedgie (Smokin Wedgie—Stainless Steel—BBQ Pellet Smoker Box; https://www.amazon.com/Smokin-Wedgies-Stainless-Steel/dp/B014I51RKE/ref=sr_1_40?crid=6MPSIEC8YC1W&keywords=grill+smoker+box&qid=1706119414&sprefix=grill+smoker+bo%2Caps%2C134&sr=8-40 (Year: 2015).*

(Continued)

*Primary Examiner* — Vivek K Shirsat

(57) ABSTRACT

Example L-shaped smoker boxes for gas grills are disclosed. An example smoker box includes a base and a lid. The base includes a bottom wall having an L-shaped profile. The lid includes a top wall having an L-shaped profile.

20 Claims, 19 Drawing Sheets

(56) References Cited

U.S. PATENT DOCUMENTS

| | | |
|---|---|---|
| 9,486,000 B2 | 11/2016 | Kaderli |
| 9,839,224 B2 | 12/2017 | Patton |
| 9,848,612 B1 | 12/2017 | Bourgeois et al. |
| 9,867,383 B2 | 1/2018 | Borovicka et al. |
| 10,021,888 B2 | 7/2018 | McLamb |
| 10,051,879 B2 | 8/2018 | Mafi |
| 10,188,120 B2 | 1/2019 | Cohen |
| 10,641,495 B2 | 5/2020 | Hamm |
| 2002/0166460 A1 | 11/2002 | O'Shea |
| 2004/0216622 A1 | 11/2004 | Martin |
| 2005/0271783 A1 | 12/2005 | Digges, III |
| 2008/0163765 A1 | 7/2008 | O'Shea |
| 2008/0257174 A1 | 10/2008 | Turner |
| 2009/0004348 A1 | 1/2009 | Silva |
| 2009/0308264 A1 | 12/2009 | Estess et al. |
| 2009/0311393 A1 | 12/2009 | Estess et al. |
| 2010/0218691 A1* | 9/2010 | Adams .................. A23B 4/052 99/482 |
| 2013/0004633 A1 | 1/2013 | McMaster et al. |
| 2015/0257399 A1 | 9/2015 | Valiquette |
| 2016/0235079 A1 | 8/2016 | Singleterry |
| 2017/0311615 A1 | 11/2017 | King |
| 2018/0213974 A1 | 8/2018 | Mafi |
| 2018/0325314 A1 | 11/2018 | Walters |
| 2018/0360058 A1 | 12/2018 | Giebel et al. |
| 2020/0196798 A1 | 6/2020 | Boltz et al. |
| 2021/0037841 A1 | 2/2021 | Bozzato et al. |

FOREIGN PATENT DOCUMENTS

| | | |
|---|---|---|
| CN | 109539319 | 3/2019 |
| TW | 200739003 | 10/2007 |
| WO | 2020091895 | 5/2020 |

OTHER PUBLICATIONS

Taiwan Intellectual Property Office, "Taiwan Decision of Rejection" issued in connection with Taiwanese Patent Application No. 110139660, dated Jun. 19, 2023, 3 pages. (Machine Translation Included).

Taiwan Intellectual Property Office, "Taiwan Search Report and Office Action," issued in connection with Taiwan Patent Application No. 110139660, dated Mar. 7, 2023, 21 pages. (English Translation Included).

International Searching Authority, "International Search Report and Written Opinion," issued in connection with International Patent Application No. PCT/US2021/054541, dated Jan. 14, 2022, 9 pages.

International Bureau, "International Preliminary Report on Patentability," issued in connection with International Patent Application No. PCT/US2021/054541, dated Nov. 2, 2023, 6 pages.

* cited by examiner

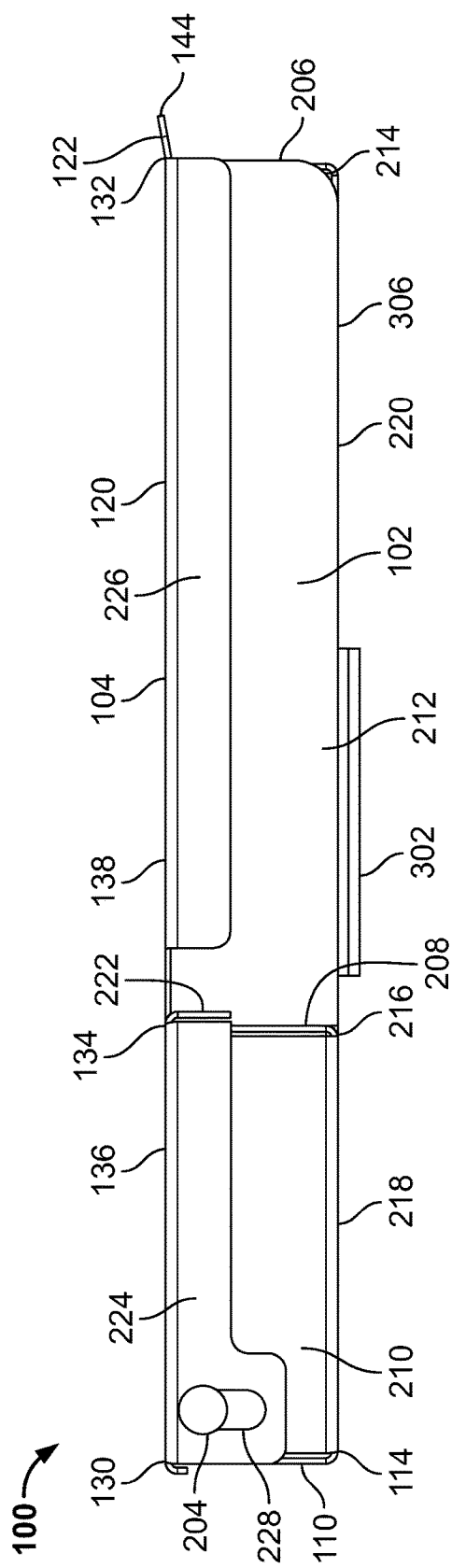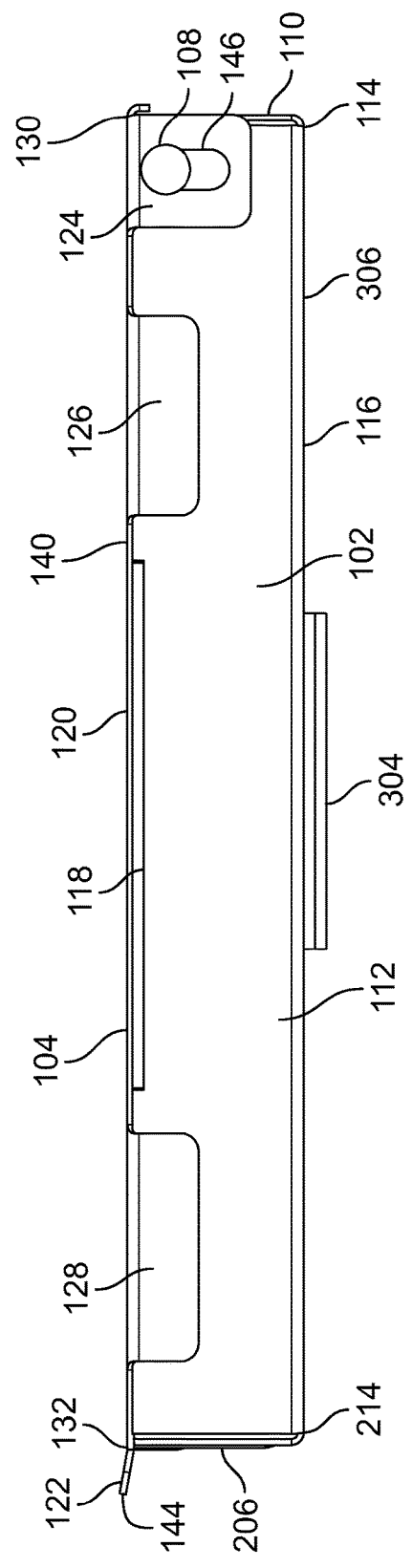

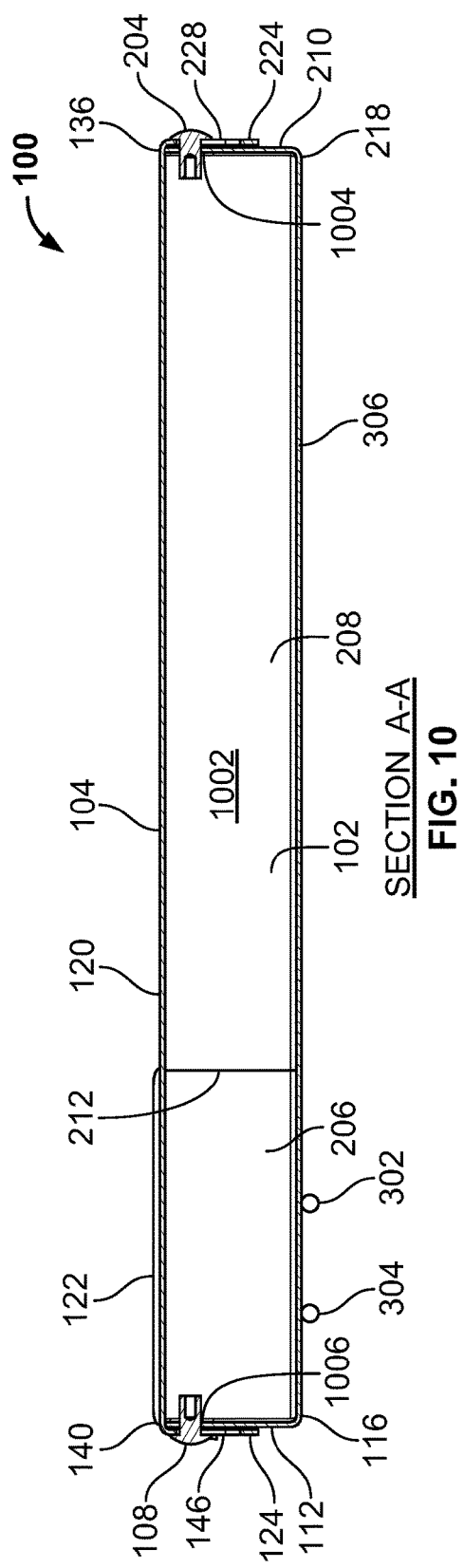
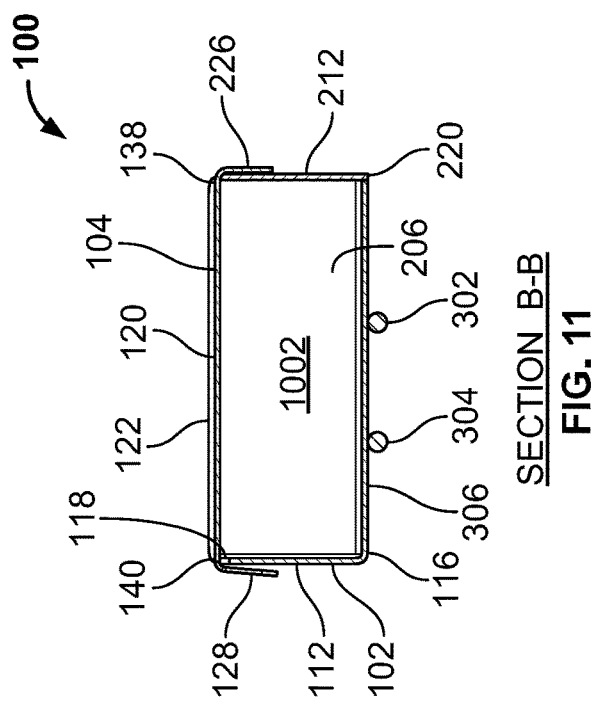

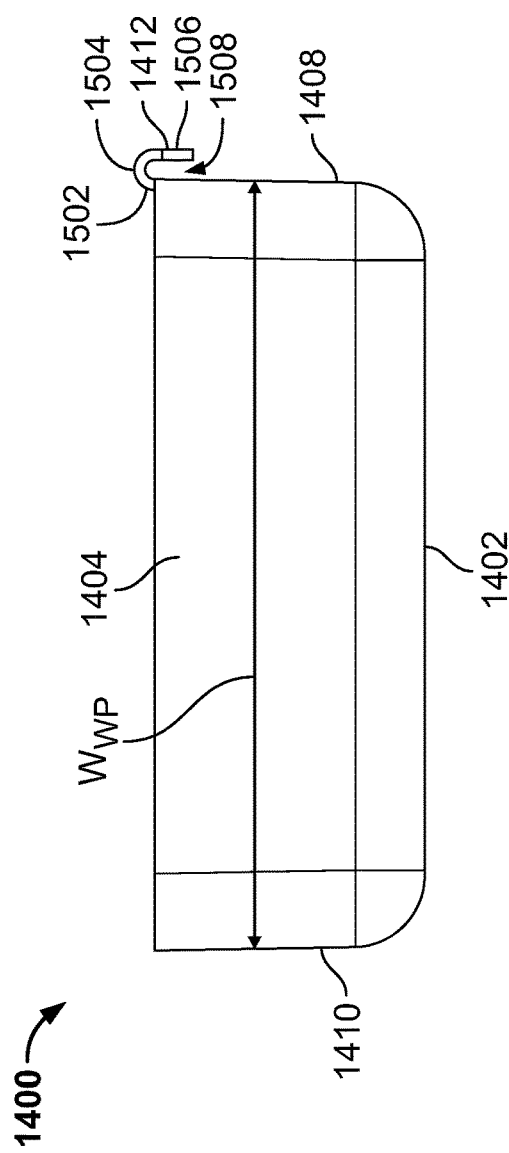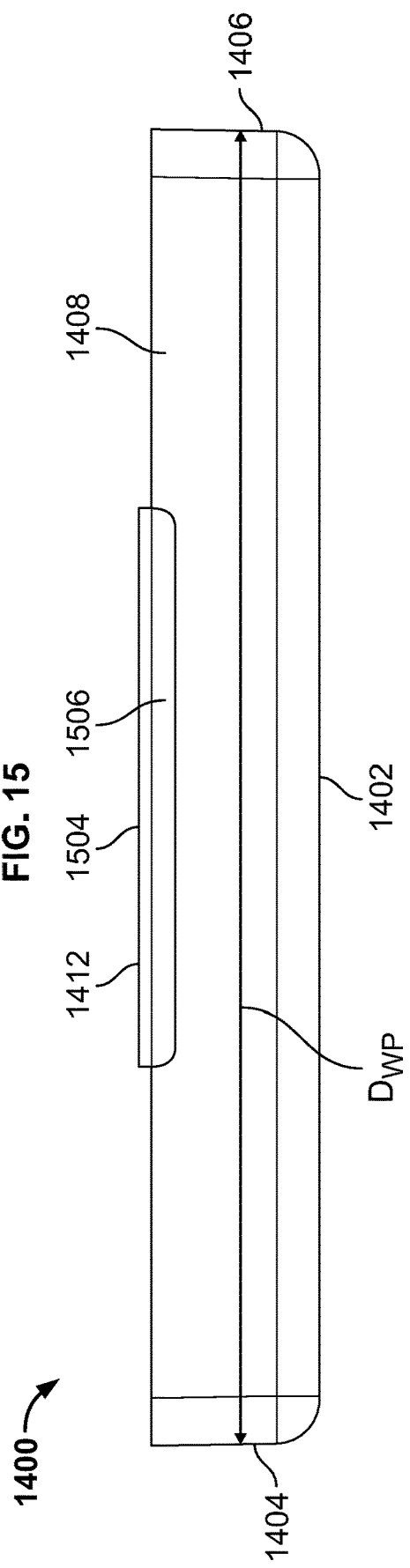

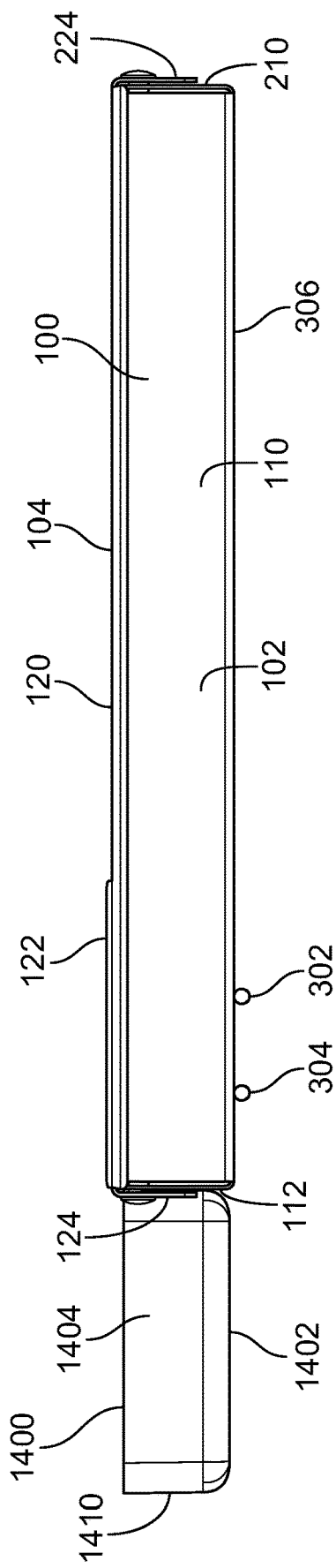
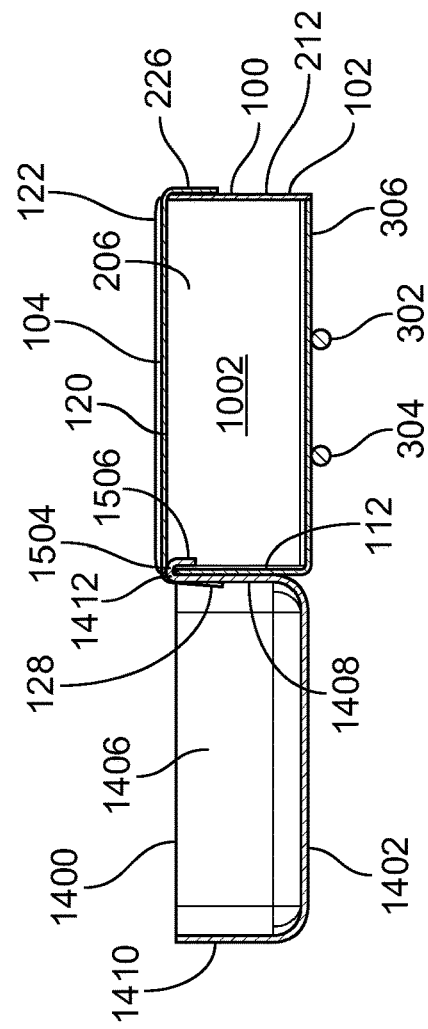
FIG. 19
SECTION C-C
FIG. 20

L-SHAPED SMOKER BOXES FOR GAS GRILLS

RELATED APPLICATIONS

This application claims priority to U.S. Provisional Patent Application No. 63/178,348, filed Apr. 22, 2021. The entirety of U.S. Provisional Patent Application No. 63/178,348 is hereby incorporated by reference herein.

FIELD OF THE DISCLOSURE

This disclosure relates generally to smoker boxes and, more specifically, to L-shaped smoker boxes for gas grills.

BACKGROUND

Smoker boxes are routinely used in connection with grills (e.g., gas grills, charcoal grills, electric grills, etc.) to enhance the flavor of one or more food item(s) being cooked on a cooking surface of the grill. Some known smoker boxes include a base configured to be positioned directly on one or more cooking grate(s) of the grill. Other known smoker boxes are specifically configured for use with gas grills having one or more burner(s), one or more grease deflection bar(s) positioned above the burner(s), and one or more cooking grate(s) positioned above the grease deflection bar(s). In such instances, the smoker boxes typically include a base configured to be positioned below the cooking grate(s) of the gas grill and directly on one or more of the grease deflection bar(s) of the gas grill. Regardless of their intended positioning (e.g., whether directly on a cooking grate, or directly on a grease deflection bar), known smoker boxes typically have a rectangular shape and/or profile when viewed from the top side of the smoker box.

BRIEF DESCRIPTION OF THE DRAWINGS

FIG. 8 is a right side view of the smoker box of FIGS. 1-7, with the lid of the smoker box shown in the closed position of FIGS. 1-7.

FIG. 9 is a left side view of the smoker box of FIGS. 1-8, with the lid of the smoker box shown in the closed position of FIGS. 1-8.

FIG. 10 is a cross-sectional view of the smoker box of FIGS. 1-9 taken along section A-A of FIG. 4, with the lid of the smoker box shown in the closed position of FIGS. 1-9.

FIG. 11 is a cross-sectional view of the smoker box of FIGS. 1-10 taken along section B-B of FIG. 4, with the lid of the smoker box shown in the closed position of FIGS. 1-10.

FIG. 15 is a front view of the water pan of FIG. 14.

FIG. 16 is a right side view of the water pan of FIGS. 14 and 15.

FIG. 19 is a front view of the smoker box of FIGS. 1-12, 17, and 18, with the water pan of FIGS. 14-18 coupled to the smoker box, and with the lid of the smoker box shown in the closed position of FIGS. 1-11, 17, and 18.

FIG. 20 is a cross-sectional view taken along section C-C of FIG. 18 showing the smoker box of FIGS. 1-12 and 17-19 and the water pan of FIGS. 14-19 coupled to one another, with the lid of the smoker box shown in the closed position of FIGS. 1-11 and 17-19.

Figure 1:
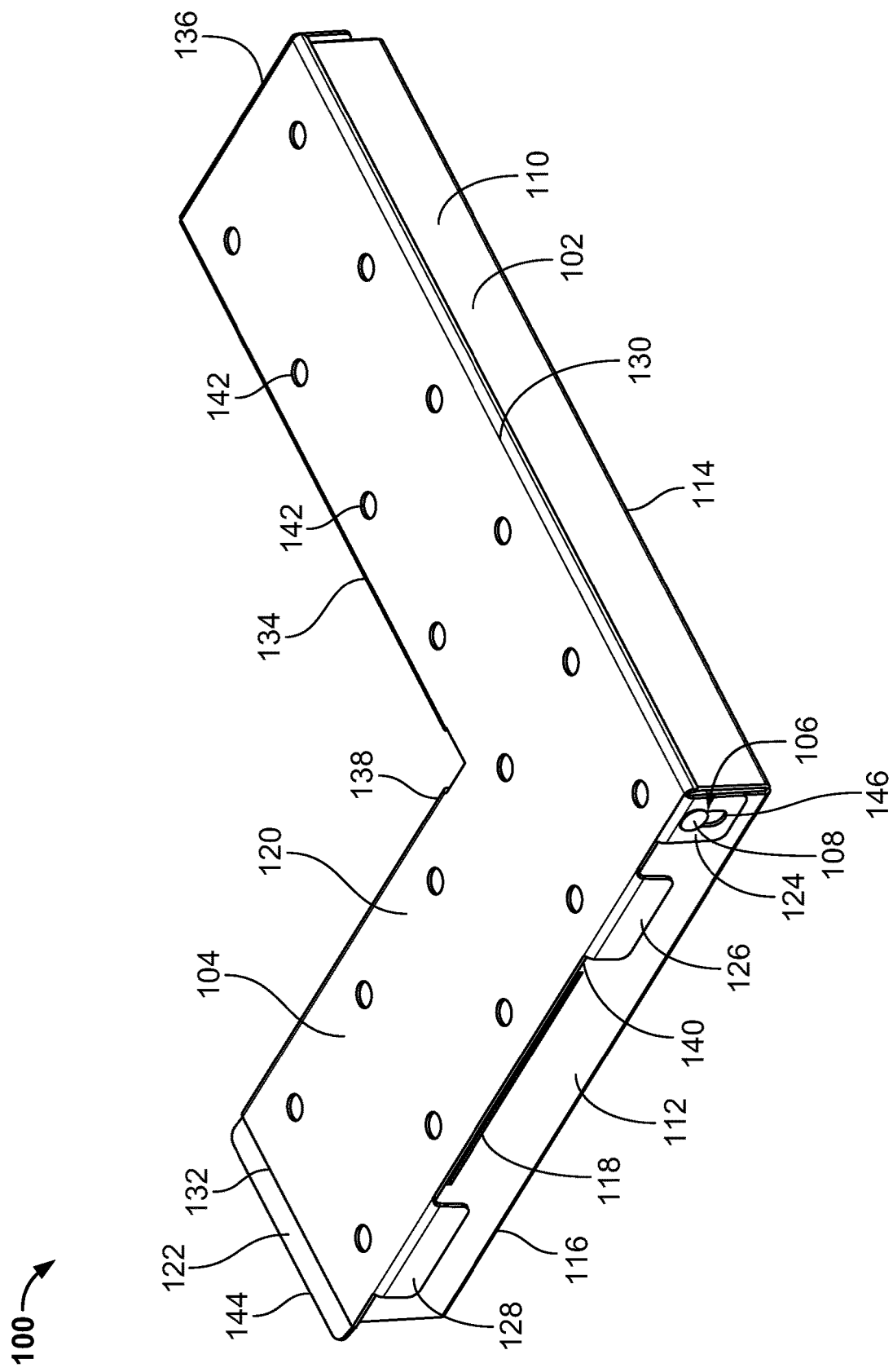
FIG. 1 is a first perspective view of an example smoker box constructed in accordance with teachings of this disclosure, with an example lid of the smoker box shown in a closed position relative to an example base of the smoker box.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example smoker boxes disclosed herein have L-shaped profiles. In some disclosed examples, the smoker box includes a base and a lid. The base of the smoker box includes a bottom wall having an L-shaped profile. The lid includes a top wall having an L-shaped profile. In some disclosed examples, the base of the smoker box includes a first linear section, a second linear section extending orthogonally from the first linear section, and an elbow located between and joining the first linear section and the second linear section. In some disclosed examples, the first linear section includes an ignition zone, the elbow includes a transition zone, and the second linear section includes an end zone. The transition zone is configured to advantageously reduce a rate of propagation of a smolder of solid-form smoking materials as the smolder progresses from the ignition zone to the end zone. The decrease in propagation rate advantageously reduces the burn rate of the solid-form smoking materials, which in turn advantageously increases the duration of the smoking process. Increasing the duration of the smoking process in turn advantageously increases the degree to which flavor owed to the generated smoke is transferred and/or imparted to one or more food item(s) being cooked within a cookbox of a gas grill with which the smoker box is being used.

In some disclosed examples, the bottom wall of the base of the smoker box has a width configured to extend between a first grease deflection bar and a second grease deflection bar, the first grease deflection bar and the second grease deflection bar being respectively located within a cookbox of a grill. In such examples, the second grease deflection bar is spaced apart from and oriented parallel to the first grease deflection bar, the first grease deflection bar is positioned over one of a plurality of burners located within the cookbox of the grill, and the second grease deflection bar is not positioned over any of the plurality of burners located within the cookbox of the grill. In some such examples, the bottom wall of the base of the smoker box is further configured such that the ignition zone is to be located over the first grease deflection bar, the transition zone is to be located over the second grease deflection bar, and the end zone is to be located over the second grease deflection bar.

In some disclosed examples, a water pan is coupled to the smoker box. In such examples, fluid held within the water pan advantageously produces humidity which further enhances the smoking process generated via the smoker box. In this regard, humidity produced from fluid held within the water pan enables smoke generated by and/or emanating from the smoker box to better adhere to one or more food item(s) being cooked within a cookbox of a gas grill with which the smoker box is being used.

The above-identified features as well as other advantageous features of example L-shaped smoker boxes as disclosed herein are further described below in connection with the figures of the application. As used herein, the term "configured" means sized, shaped, arranged, structured, oriented, positioned and/or located. For example, in the context of a first object configured to fit within a second object, the first object is sized, shaped, arranged, structured, oriented, positioned and/or located to fit within the second object. As used herein in the context of a first object circumscribing a second object, the term "circumscribe" means that the first object is constructed around and/or defines an area around the second object. In interpreting the term "circumscribe" as used herein, it is to be understood that the first object circumscribing the second object can include gaps and/or can consist of multiple spaced-apart objects, such that a boundary formed by the first object around the second object is not necessarily a continuous boundary. For example, a plurality of trees can circumscribe a field.

Figure 2:
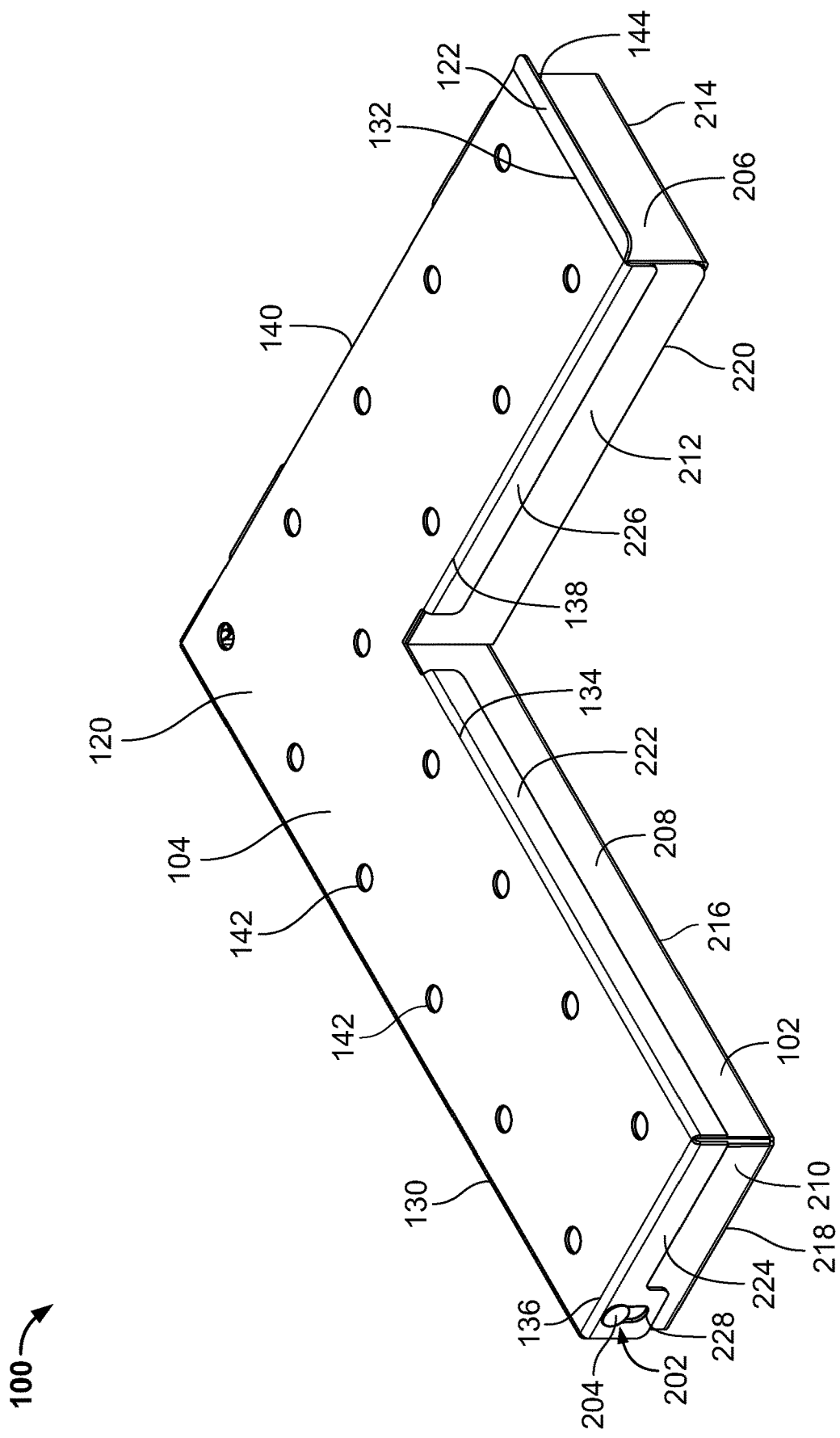
FIG. 2 is a second perspective view of the smoker box of FIG. 1, with the lid of the smoker box shown in the closed position of FIG. 1.
Figure 3:
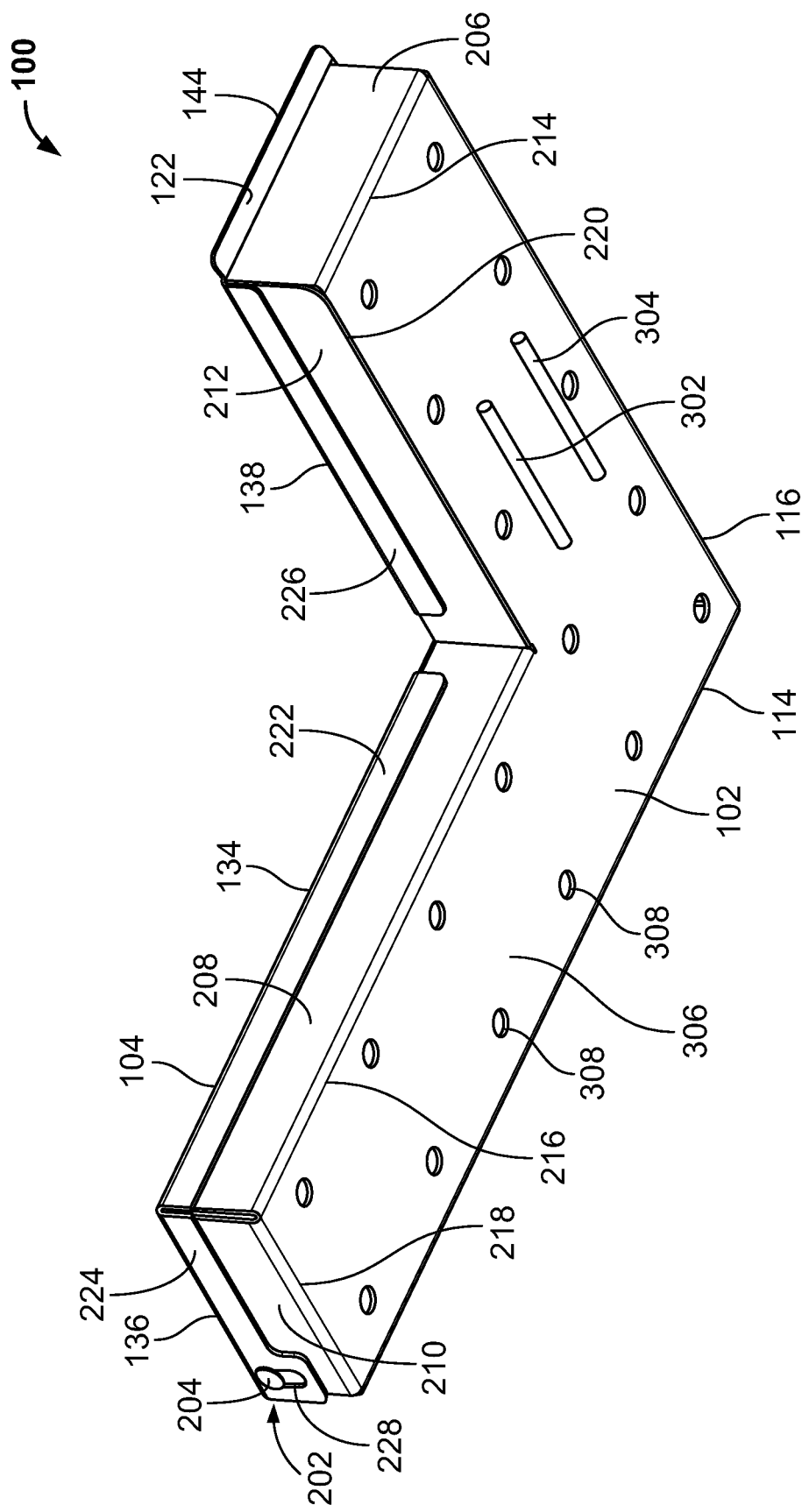
FIG. 3 is a third perspective view of the smoker box of FIGS. 1 and 2, with the lid of the smoker box shown in the closed position of FIGS. 1 and 2.
Figure 4:
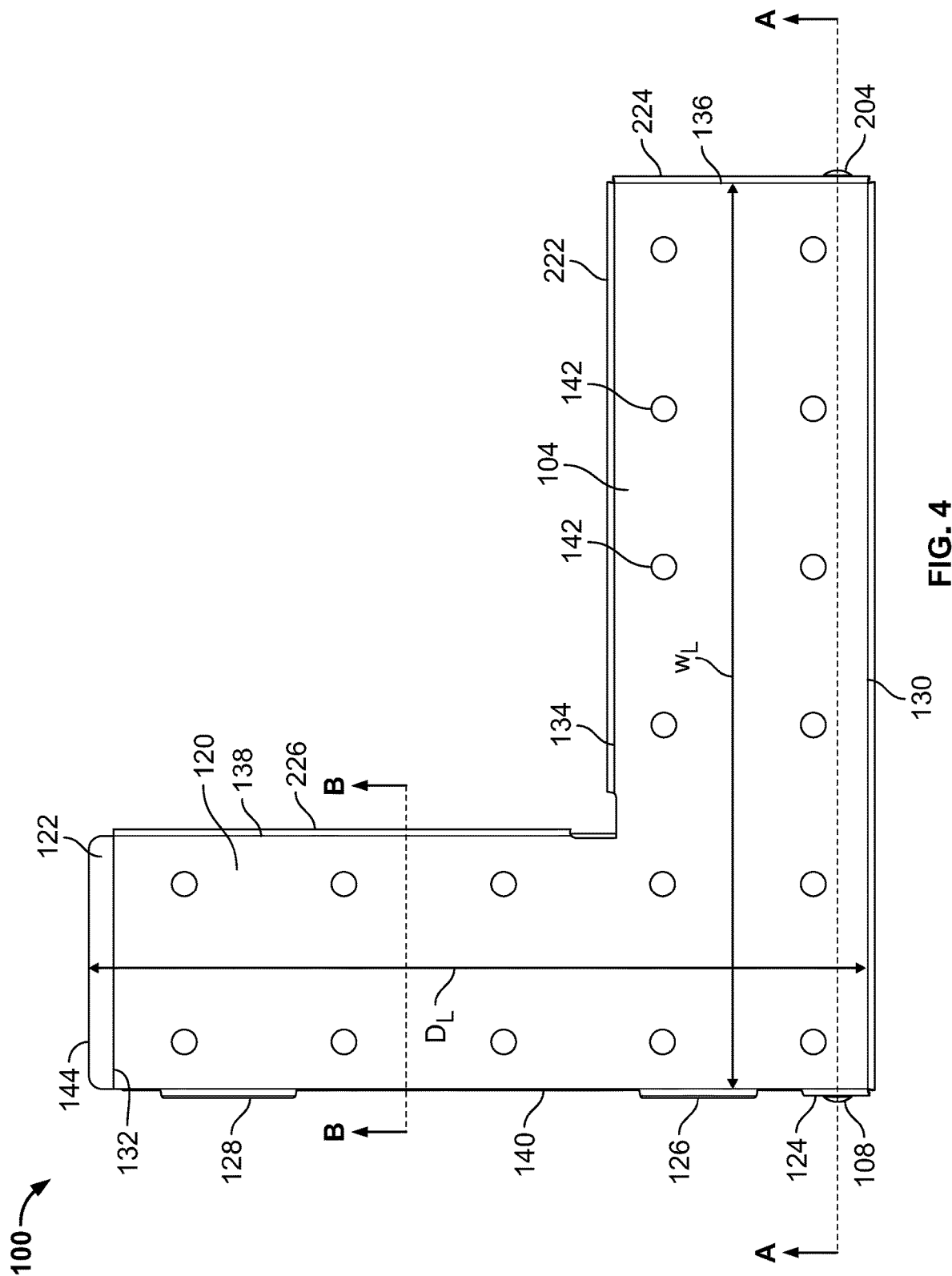
FIG. 4 is a top view of the smoker box of FIGS. 1-3, with the lid of the smoker box shown in the closed position of FIGS. 1-3.
Figure 5:
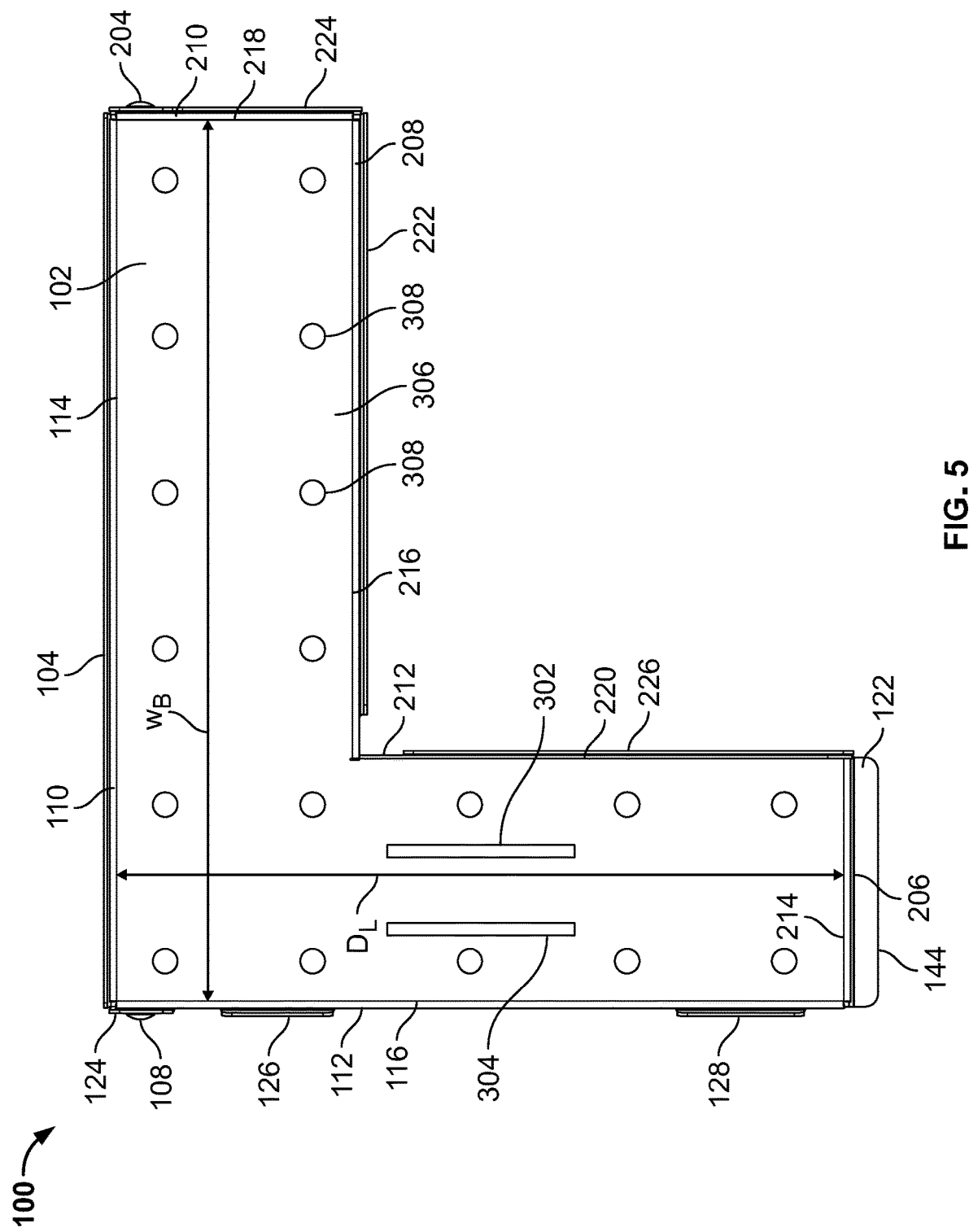
FIG. 5 is a bottom view of the smoker box of FIGS. 1-4, with the lid of the smoker box shown in the closed position of FIGS. 1-4.
Figure 6:
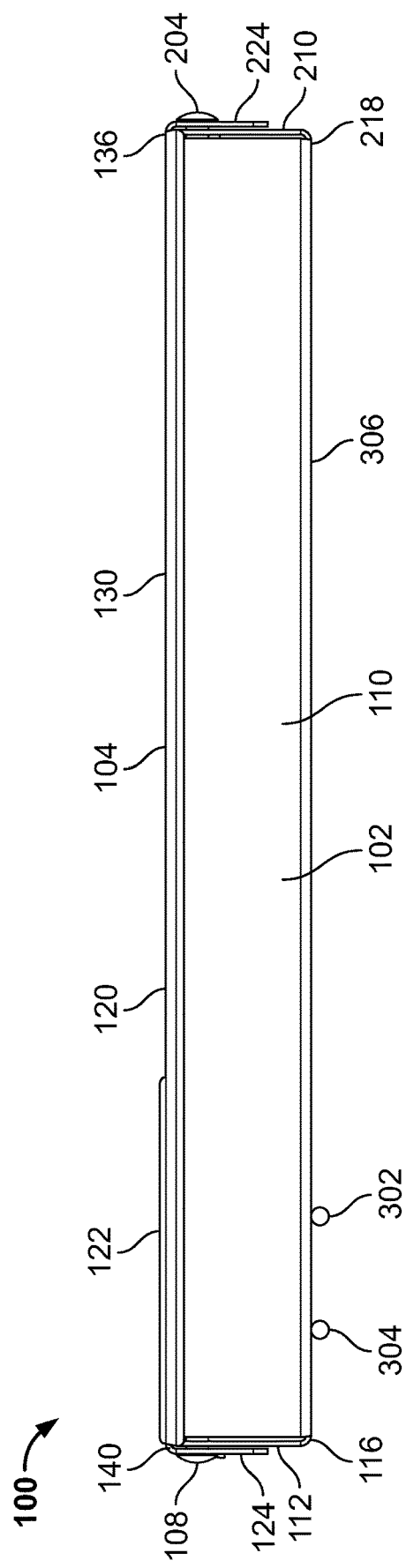
FIG. 6 is a front view of the smoker box of FIGS. 1-5, with the lid of the smoker box shown in the closed position of FIGS. 1-5.
Figure 7:
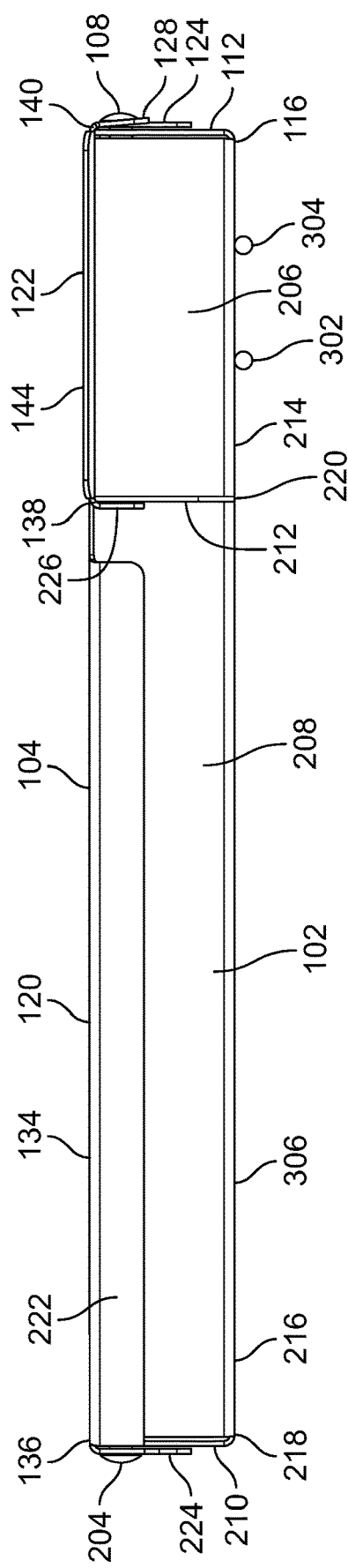
FIG. 7 is a rear view of the smoker box of FIGS. 1-6, with the lid of the smoker box shown in the closed position of FIGS. 1-6.
Figure 12:
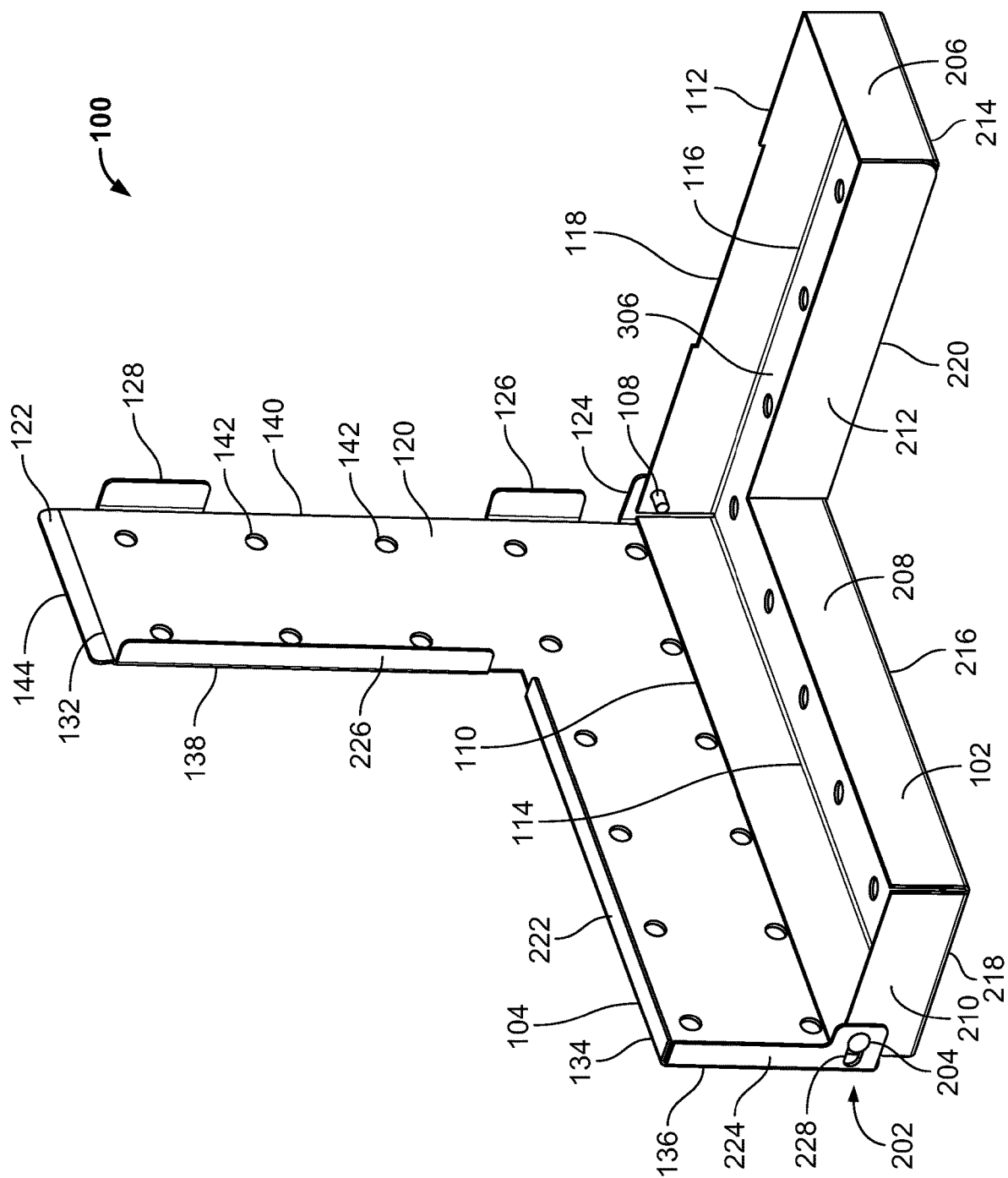
FIG. 12 is a fourth perspective view of the smoker box of FIGS. 1-11, with the lid of the smoker box shown in an open position relative to the base of the smoker box.

FIG. 1 is a first perspective view of an example smoker box 100 constructed in accordance with teachings of this disclosure, with an example lid 104 of the smoker box 100 shown in a closed position relative to an example base 102 of the smoker box 100. FIG. 2 is a second perspective view of the smoker box 100 of FIG. 1, with the lid 104 of the smoker box 100 shown in the closed position of FIG. 1. FIG. 3 is a third perspective view of the smoker box 100 of FIGS. 1 and 2, with the lid 104 of the smoker box 100 shown in the closed position of FIGS. 1 and 2. FIG. 4 is a top view of the smoker box 100 of FIGS. 1-3, with the lid 104 of the smoker box 100 shown in the closed position of FIGS. 1-3. FIG. 5 is a bottom view of the smoker box 100 of FIGS. 1-4, with the lid 104 of the smoker box 100 shown in the closed position of FIGS. 1-4. FIG. 6 is a front view of the smoker box 100 of FIGS. 1-5, with the lid 104 of the smoker box 100 shown in the closed position of FIGS. 1-5. FIG. 7 is a rear view of the smoker box 100 of FIGS. 1-6, with the lid 104 of the smoker box 100 shown in the closed position of FIGS. 1-6. FIG. 8 is a right side view of the smoker box 100 of FIGS. 1-7, with the lid 104 of the smoker box 100 shown in the closed position of FIGS. 1-7. FIG. 9 is a left side view of the smoker box 100 of FIGS. 1-8, with the lid 104 of the smoker box 100 shown in the closed position of FIGS. 1-8. FIG. 10 is a cross-sectional view of the smoker box 100 of FIGS. 1-9 taken along section A-A of FIG. 4, with the lid 104 of the smoker box 100 shown in the closed position of FIGS. 1-9. FIG. 11 is a cross-sectional view of the smoker box 100 of FIGS. 1-10 taken along section B-B of FIG. 4, with the lid 104 of the smoker box 100 shown in the closed position of FIGS. 1-10. FIG. 12 is a fourth perspective view of the smoker box 100 of FIGS. 1-11, with the lid 104 of the smoker box 100 shown in an open position relative to the base 102 of the smoker box 100.

In the illustrated example of FIGS. 1-12, the smoker box 100 includes the base 102, the lid 104, an example first hinge 202 having an example first pin 204, an example second hinge 106 having an example second pin 108, an example first positioning rod 302, and an example second positioning rod 304. The lid 104 of the smoker box 100 is coupled (e.g., rotatably coupled) to the base 102 of the smoker box 100 via the first hinge 202 and the second hinge 106 of the smoker box 100, with the lid 104 being movable (e.g., rotatable) relative to the base 102 between the closed position shown in FIGS. 1-11 and the open position shown in FIG. 12.

The base 102 of the smoker box 100 of FIGS. 1-12 defines and/or provides an example compartment 1002 that can be filled with solid-form smoking materials (e.g., wood chips, wood pellets, etc.) when the lid 104 of the smoker box 100 is in the open position shown in FIG. 12. Once such smoking materials have been added to the compartment 1002, the lid 104 of the smoker box 100 can be moved (e.g., rotated) from the open position shown in FIG. 12 into the closed position shown in FIGS. 1-11 to retain the smoking materials within the compartment 1002, and/or to facilitate a smoke-generating process within the compartment 1002.

In the illustrated example of FIGS. 1-12, the base 102 of the smoker box 100 includes an example bottom wall 306, an example front wall 110, an example first rear wall 206, an example second rear wall 208, an example first right sidewall 210, an example second right sidewall 212, and an example left sidewall 112. The front wall 110, the first rear wall 206, the second rear wall 208, the first right sidewall 210, the second right sidewall 212, and the left sidewall 112 of the base 102 respectively extend upwardly from the bottom wall 306 of the base 102, as further described below.

The bottom wall 306 of the base 102 of FIGS. 1-12 includes an example front edge 114, an example first rear edge 214, an example second rear edge 216, an example first right edge 218, an example second right edge 220, and an example left edge 116. The first rear edge 214 and the second rear edge 216 of the bottom wall 306 are respectively located opposite the front edge 114 of the bottom wall 306, with the second rear edge 216 of the bottom wall 306 being spaced apart from the first rear edge 214 of the bottom wall 306 and located at a position between the front edge 114 and the first rear edge 214 of the bottom wall 306. The first right edge 218 and the second right edge 220 of the bottom wall 306 are respectively located opposite the left edge 116 of the bottom wall 306, with the second right edge 220 of the bottom wall 306 being spaced apart from the first right edge 218 of the bottom wall 306 and located at a position between the left edge 116 and the first right edge 218 of the bottom wall 306.

In the illustrated example of FIGS. 1-12, the front edge 114 of the bottom wall 306 extends between the first right edge 218 and the left edge 116 of the bottom wall 306. The left edge 116 of the bottom wall 306 extends between the front edge 114 and the first rear edge 214 of the bottom wall 306. The first rear edge 214 of the bottom wall 306 extends between the left edge 116 and the second right edge 220 of the bottom wall 306. The second right edge 220 of the bottom wall 306 extends between the first rear edge 214 and the second rear edge 216 of the bottom wall 306. The second rear edge 216 of the bottom wall 306 extends between the second right edge 220 and the first right edge 218 of the bottom wall 306. The first right edge 218 of the bottom wall 306 extends between the second rear edge 216 and the front edge 114 of the bottom wall 306. As shown in FIGS. 1-12, the bottom wall 306 and/or, more generally, the base 102 of the smoker box 100 has a substantially flat (e.g., planar), L-shaped profile when viewed from the top side of the base 102 and/or from the top side of the smoker box 100, with the L-shaped profile being defined by the front edge 114, the first rear edge 214, the second rear edge 216, the first right edge 218, the second right edge 220, and the left edge 116 of the bottom wall 306.

The first positioning rod 302 and the second positioning rod 304 of the smoker box 100 are respectively coupled (e.g., welded) to the underside of the bottom wall 306 of the base 102 of the smoker box 100. In the illustrated example of FIGS. 1-12, the first positioning rod 302 and the second positioning rod 304 are spaced apart from and oriented parallel to one another. The first positioning rod 302 and the second positioning rod 304 are respectively positioned on the underside of the bottom wall 306 of the base 102 at a location between the second right edge 220 and the left edge 116 of the bottom wall 306, with the first positioning rod 302 and the second positioning rod 304 respectively being oriented parallel to the second right edge 220 and/or the left edge 116 of the bottom wall 306. The first positioning rod 302 and the second positioning rod 304 respectively assist in locating the bottom wall 306 and/or, more generally, the base 102 of the smoker box 100 on a grease deflection bar of a gas grill, as further described below.

The bottom wall 306 of the base 102 of FIGS. 1-12 further includes example openings 308 (e.g., through holes) formed in and extending through the bottom wall 306. The openings 308 formed in the bottom wall 306 of the base 102 can be configured to have any size and/or any shape that is suitable for facilitating a smoke-generating process within the compartment 1002 of the smoker box 100, while also preventing solid-form smoking materials (e.g., wood chips, wood pellets, etc.) contained within the compartment 1002 from passing through the bottom wall 306 of the base 102. The openings 308 formed in the bottom wall 306 of the base 102 can be configured according to any layout, pattern, and/or arrangement that facilitates a smoke-generating process within the compartment 1002 of the smoker box 100.

In the illustrated example of FIGS. 1-12, the front wall 110 of the base 102 extends upwardly from the front edge 114 of the bottom wall 306 of the base 102. The first rear wall 206 of the base 102 extends upwardly from the first rear edge 214 of the bottom wall 306 of the base 102. The second rear wall 208 of the base 102 extends upwardly from the second rear edge 216 of the bottom wall 306 of the base 102. The first right sidewall 210 of the base 102 extends upwardly from the first right edge 218 of the bottom wall 306 of the base 102. The second right sidewall 212 of the base 102 extends upwardly from the second right edge 220 of the bottom wall 306 of the base 102. The left sidewall 112 of the base 102 extends upwardly from the left edge 116 of the bottom wall 306 of the base 102.

As shown in FIGS. 1-12, the front wall 110, the first rear wall 206, the second rear wall 208, the first right sidewall 210, the second right sidewall 212, and the left sidewall 112 of the base 102 respectively extend upwardly from the bottom wall 306 of the base 102 at an orthogonal angle (e.g., an angle of 90 degrees). In other examples, one or more of the front wall 110, the first rear wall 206, the second rear wall 208, the first right sidewall 210, the second right sidewall 212, and/or the left sidewall 112 of the base 102 can instead extend upwardly from the bottom wall 306 of the base 102 at a non-orthogonal angle (e.g., at an angle greater than or less than 90 degrees).

As shown in FIGS. 1-12, the front wall 110, the first rear wall 206, the second rear wall 208, the first right sidewall 210, the second right sidewall 212, and the left sidewall 112 of the base 102 respectively have a generally rectangular profile defined in part by a corresponding one of the front edge 114, the first rear edge 214, the second rear edge 216, the first right edge 218, the second right edge 220, and the left edge 116 of the bottom wall 306 of the base 102. In other examples, one or more of the front wall 110, the first rear wall 206, the second rear wall 208, the first right sidewall 210, the second right sidewall 212, and/or the left sidewall 112 of the base 102 can instead have a non-rectangular rectangular profile (e.g., a triangular profile, a trapezoidal profile, a hexagonal profile, etc.) defined in part by a corresponding one of the front edge 114, the first rear edge 214, the second rear edge 216, the first right edge 218, the second right edge 220, and/or the left edge 116 of the bottom wall 306 of the base 102.

The first right sidewall 210 of the base 102 of FIGS. 1-12 includes an example opening 1004 (e.g., a through hole) formed in and extending through the first right sidewall 210, with the opening 1004 being configured to receive the first pin 204 of the first hinge 202. The left sidewall 112 of the base 102 of FIGS. 1-12 includes an example opening 1006 (e.g., a through hole) formed in and extending through the left sidewall 112, with the opening 1006 being configured to receive the second pin 108 of the second hinge 106. In the illustrated example of FIGS. 1-12, the opening 1004 formed in the first right sidewall 210 of the base 102 is coaxially aligned with the opening 1006 formed in the left sidewall 112 of the base 102, and the first pin 204 of the first hinge 202 is coaxially aligned with the second pin 108 of the second hinge 106.

The left sidewall 112 of the base 102 of FIGS. 1-12 further includes an example channel 118 formed along an upper edge of the left sidewall 112. The channel 118 of the left sidewall 112 of the base 102 is configured to receive a hook portion of a water pan to facilitate coupling the water pan to the smoker box 100 along the left sidewall 112 of the base 102, as further described below. In the illustrated example of FIGS. 1-12, the channel 118 of the left sidewall 112 of the base 102 is located approximately midway between the front wall 110 and the first rear wall 206 of the base 102. In other examples, the channel 118 of the left sidewall 112 of the base 102 can instead be located more proximate (e.g., relative to the position shown in FIGS. 1-12) the front wall 110 of the base 102. In still other examples, the channel 118 of the left sidewall 112 of the base 102 can instead be located more proximate (e.g., relative to the position shown in FIGS. 1-12) the first rear wall 206 of the base 102.

The base 102 of the smoker box 100 of FIGS. 1-12 has a depth ($D_B$) extending from the front wall 110 (e.g., at the front edge 114 of the bottom wall 306) to the first rear wall 206 (e.g., at the first rear edge 214 of the bottom wall 306), and a width ($W_B$) extending from the first right sidewall 210 (e.g., at the first right edge 218 of the bottom wall 306) to the left sidewall 112 (e.g., at the left edge 116 of the bottom wall 306). In the illustrated example of FIGS. 1-12, the base 102 of the smoker box 100 is configured such that the width ($W_B$) of the base 102 exceeds the depth ($D_B$) of the base 102. In other examples, the base 102 of the smoker box 100 can instead be configured such that the depth ($D_B$) of the base 102 is greater than or equal to the width ($W_B$) of the base 102.

In the illustrated example of FIGS. 1-12, the lid 104 of the smoker box 100 includes an example top wall 120, an example first rear flange 122, an example second rear flange 222, an example first right flange 224, an example second right flange 226, an example first left flange 124, an example second left flange 126, and an example third left flange 128. The second rear flange 222, the first right flange 224, the second right flange 226, the first left flange 124, the second left flange 126, and the third left flange 128 of the lid 104 respectively extend downwardly from the top wall 120 of the lid 104, and the first rear flange 122 of the lid 104 extends rearwardly from the top wall 120 of the lid, as further described below.

The top wall 120 of the lid 104 of FIGS. 1-12 includes an example front edge 130, an example first rear edge 132, an example second rear edge 134, an example first right edge 136, an example second right edge 138, and an example left edge 140. The first rear edge 132 and the second rear edge 134 of the top wall 120 are respectively located opposite the front edge 130 of the top wall 120, with the second rear edge 134 of the top wall 120 being spaced apart from the first rear edge 132 of the top wall 120 and located at a position between the front edge 130 and the first rear edge 132 of the top wall 120. The first right edge 136 and the second right edge 138 of the top wall 120 are respectively located opposite the left edge 140 of the top wall 120, with the second right edge 138 of the top wall 120 being spaced apart from the first right edge 136 of the top wall 120 and located at a position between the left edge 140 and the first right edge 136 of the top wall 120.

In the illustrated example of FIGS. 1-12, the front edge 130 of the top wall 120 extends between the first right edge 136 and the left edge 140 of the top wall 120. The left edge 140 of the top wall 120 extends between the front edge 130 and the first rear edge 132 of the top wall 120. The first rear edge 132 of the top wall 120 extends between the left edge 140 and the second right edge 138 of the top wall 120. The second right edge 138 of the top wall 120 extends between the first rear edge 132 and the second rear edge 134 of the top wall 120. The second rear edge 134 of the top wall 120 extends between the second right edge 138 and the first right edge 136 of the top wall 120. The first right edge 136 of the top wall 120 extends between the second rear edge 134 and the front edge 130 of the top wall 120. As shown in FIGS. 1-12, the top wall 120 and/or, more generally, the lid 104 of the smoker box 100 has a substantially flat (e.g., planar), L-shaped profile when viewed from the top side of the lid 104 and/or from the top side of the smoker box 100, with the L-shaped profile being defined by the front edge 130, the first rear edge 132, the second rear edge 134, the first right edge 136, the second right edge 138, and the left edge 140 of the top wall 120. In the illustrated example of FIGS. 1-12, the L-shaped profile of the top wall 120 and/or the lid 104 of the smoker box 100 corresponds in shape and substantially corresponds in size to the L-shaped profile of the bottom wall 306 and/or the base 102 of the smoker box 100.

The top wall 120 of the lid 104 of FIGS. 1-12 further includes example openings 142 (e.g., example through holes) formed in and extending through the top wall 120. The openings 142 formed in the top wall 120 of the lid 104 can be configured to have any size and/or any shape that is suitable for facilitating a smoke-generating process within the compartment 1002 of the smoker box 100, while also preventing solid-form smoking materials (e.g., wood chips, wood pellets, etc.) contained within the compartment 1002 from passing through the top wall 120 of the lid 104. The openings 142 formed in the top wall 120 of the lid 104 can be configured according to any layout, pattern, and/or arrangement that facilitates a smoke-generating process within the compartment 1002 of the smoker box 100.

In the illustrated example of FIGS. 1-12, the first rear flange 122 of the lid 104 extends rearwardly from the first rear edge 132 of the top wall 120 of the lid 104. The second rear flange 222 of the lid 104 extends downwardly from the second rear edge 134 of the top wall 120 of the lid 104. The first right flange 224 of the lid 104 extends downwardly from the first right edge 136 of the top wall 120 of the lid 104. The second right flange 226 of the lid 104 extends downwardly from the second right edge 138 of the top wall 120 of the lid 104. The first left flange 124, the second left flange 126, and the third left flange 128 of the lid 104 respectively extend downwardly from the left edge 140 of the top wall 120 of the lid 104. In the illustrated example of FIGS. 1-12, the second left flange 126 of the lid 104 is spaced apart from the first left flange 124 of the lid 104, and the third left flange 128 of the lid 104 is spaced apart from the second left flange 126 of the lid 104. In other examples, two or more of the first left flange 124, the second left flange 126, and the third left flange 128 can instead be formed as a single, continuous left flange that extends downwardly from the left edge 140 of the top wall 120 of the lid 104.

In the illustrated example of FIGS. 1-12, the second left flange 126 and the third left flange 128 of the lid 104 are respectively configured such that the channel 118 of the left sidewall 112 of the base 102 is located between the second left flange 126 and the third left flange 128 of the lid 104 when the lid 104 is in the closed position shown in FIGS. 1-11. In other examples, the second left flange 126 and/or the third left flange 128 of the lid 104 can instead be configured such that at least a portion of the second left flange 126 and/or a portion of the third left flange 128 of the lid 104 overlap(s) the channel 118 of the left sidewall 112 of the base 102 when the lid 104 is in the closed position shown in FIGS. 1-11

As shown in FIGS. 1-12, the second rear flange 222, the first right flange 224, the second right flange 226, the first left flange 124, the second left flange 126, and the third left flange 128 of the lid 104 respectively extend downwardly from the top wall 120 of the lid 104 at an orthogonal angle (e.g., an angle of 90 degrees). In other examples, one or more of the second rear flange 222, the first right flange 224, the second right flange 226, the first left flange 124, the second left flange 126, and/or the third left flange 128 of the lid 104 can instead extend downwardly from the top wall 120 of the lid 104 at a non-orthogonal angle (e.g., at an angle greater than or less than 90 degrees).

The first right flange 224 of the lid 104 of FIGS. 1-12 includes an example slot 228 (e.g., a slotted through hole) formed in and extending through the first right flange 224. The slot 228 of the first right flange 224 is configured to receive the first pin 204 of the first hinge 202 (e.g., such that the first pin 204 extends into and/or through the slot 228) to rotatably couple the lid 104 of the smoker box 100 to the base 102 of the smoker box 100. The slot 228 of the first right flange 224 of the lid 104 accordingly forms part of the first hinge 202 of the smoker box 100. The first left flange 124 of the lid 104 of FIGS. 1-12 includes an example slot 146 (e.g., a slotted through hole) formed in and extending through the first left flange 124. The slot 146 of the first left flange 124 is configured to receive the second pin 108 of the second hinge 106 (e.g., such that the second pin 108 extends into and/or through the slot 146) to rotatably couple the lid 104 of the smoker box 100 to the base 102 of the smoker box 100. The slot 146 of the first left flange 124 of the lid 104 accordingly forms part of the second hinge 106 of the smoker box 100. In the illustrated example of FIGS. 1-12, the slot 228 formed in the first right flange 224 of the lid 104 is coaxially aligned with the slot 146 formed in the first left flange 124 of the lid 104, and the first pin 204 of the first hinge 202 is coaxially aligned with the second pin 108 of the second hinge 106.

The lid 104 of the smoker box 100 of FIGS. 1-12 has a depth ($D_L$) extending from the front edge 114 of the top wall 120 to an example rear edge 144 of the first rear flange 122, and a width ($W_L$) extending from the first right flange 224 (e.g., at the first right edge 218 of the top wall 120) to the first left flange 124 (e.g., at the left edge 140 of the top wall 120). In the illustrated example of FIGS. 1-12, the lid 104 of the smoker box 100 is configured such that the width ($W_L$) of the lid 104 exceeds the depth ($D_L$) of the lid 104. In other examples, the lid 104 of the smoker box 100 can instead be configured such that the depth ($D_L$) of the lid 104 is greater than or equal to the width ($W_L$) of the lid 104.

In the illustrated example of FIGS. 1-12, the lid 104 of the smoker box 100 is configured such that the depth ($D_L$) and the width ($W_L$) of the lid 104 exceed the corresponding depth ($D_B$) and the corresponding width ($W_B$) of the base 102 of the smoker box 100. In this regard, the lid 104 of the smoker box 100 is configured such that the depth ($D_L$) and the width ($W_L$) of the lid 104 are large enough to locate the respective ones of the front edge 130, the first rear edge 132, the second rear edge 134, the first right edge 136, the second right edge 138, and the left edge 140 of the top wall 120 of the lid 104 outwardly of, from, and/or relative to the corresponding respective ones of the front edge 114, the first rear edge 214, the second rear edge 216, the first right edge 218, the second right edge 220, and the left edge 116 of the bottom wall 306 of the base 102 of the smoker box 100 when the lid is in the closed position shown in FIGS. 1-11. In this same regard, the lid 104 of the smoker box 100 is configured such that the depth ($D_L$) and the width ($W_L$) of the lid 104 are large enough to locate the respective ones of the first rear flange 122, the second rear flange 222, the first right flange 224, the second right flange 226, the first left flange 124, the second left flange 126, and the third left flange 128 of the lid 104 outwardly of, from, and/or relative to the corresponding respective ones of the first rear wall 206, the second rear wall 208, the first right sidewall 210, the second right sidewall 212, and the left sidewall 112 of the base 102 of the smoker box 100 when the lid is in the closed position shown in FIGS. 1-11.

Movement (e.g., rotational movement) of the lid 104 of the smoker box 100 relative to the base 102 of the smoker box 100 between the closed position shown in FIGS. 1-11 and the open position shown in FIG. 12 can be facilitated via the first rear flange 122 of the lid 104 of the smoker box 100. In this regard, the first rear flange 122 of the lid 104 can be used to raise the lid 104 from the closed position shown in FIGS. 1-11 into the open position shown in FIG. 12. Rotating the lid 104 from the closed position shown in FIGS. 1-11 into the open position shown in FIG. 12 exposes the compartment 1002 of the smoker box 100, as may be desired to facilitate adding and/or removing solid-form smoking materials to and/or from the compartment 1002. Conversely, the first rear flange 122 of the lid 104 can be used to lower the lid 104 from the open position shown in FIG. 12 into the closed position shown in FIGS. 1-11. Rotating the lid 104 from the open position shown in FIG. 12 into the closed position shown in FIGS. 1-11 covers the compartment 1002 of the smoker box 100, as may be desired to facilitate a smoke-generating process within the compartment 1002.

Figure 13:
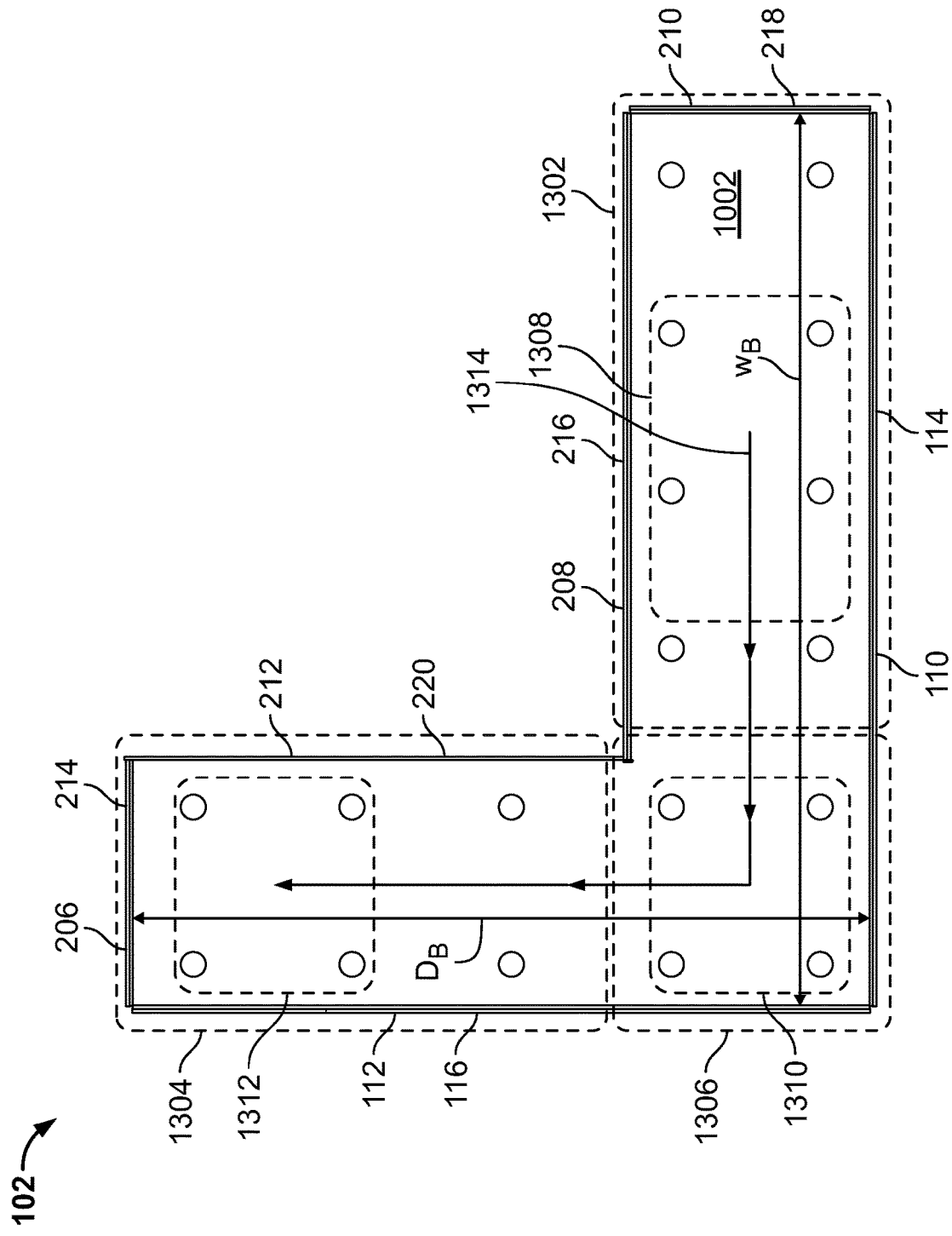
FIG. 13 is a top view of the base of the smoker box of FIGS. 1-12, with the base shown in isolation.

FIG. 13 is a top view of the base 102 of the smoker box 100 of FIGS. 1-12, with the base 102 shown in isolation. As shown in FIG. 13, the base 102 of the smoker box 100 includes an example first linear section 1302, an example second linear section 1304 extending orthogonally from the first linear section 1302, and an example elbow 1306 located between and joining the first linear section 1302 and the second linear section 1304. The first linear section 1302 of the base 102 has a generally rectangular, box-like shape, with the first linear section 1302 being defined by the second rear wall 208 and the first right sidewall 210 of the base 102, and further being defined by portions of the front wall 110 and the bottom wall 306 of the base 102. The second linear section 1304 of the base 102 also has a generally rectangular, box-like shape, with the second linear section 1304 being defined by the first rear wall 206 and the second right sidewall 212 of the base 102, and further being defined by portions of the left sidewall 112 and the bottom wall 306 of the base 102. The elbow 1306 of the base 102 also has a generally rectangular, box-like shape, with the elbow 1306 being defined by portions of the front wall 110, the left sidewall 112, and the bottom wall 306 of the base 102.

In the illustrated example of FIG. 13, the first linear section 1302 of the base 102 includes an example ignition zone 1308 located approximately midway between the first right sidewall 210 and the second right sidewall 212 of the base 102. The elbow 1306 of the base 102 includes an example transition zone 1310 located proximate the left sidewall 112 of the base 102. The second linear section 1304 of the base 102 includes an example end zone 1312 located proximate the first rear wall 206 of the base 102. The ignition zone 1308 of the first linear section 1302 is a zone and/or area in which solid-form smoking materials (e.g., wood chips, wood pellets, etc.) located within the compartment 1002 of the smoker box 100 are initially ignited (e.g., by a burner flame produced by a gas grill when the smoker box 100 is located within the gas grill). Once ignited, solid-form smoking materials located within the ignition zone 1308 of the first linear section 1302 begin to smolder. The smolder of the solid-form smoking materials thereafter propagates within the compartment 1002 of the smoker box 100 from the ignition zone 1308 of the first linear section 1302 to the transition zone 1310 of the elbow 1306, and then from the transition zone 1310 of the elbow 1306 to the end zone 1312 of the second linear section 1304, as generally indicated by the example propagation path 1314 shown in FIG. 13.

The transition zone 1310 of the elbow 1306 is a zone and/or area at which the rate of propagation of the smolder of the solid-form smoking materials within the compartment 1002 of the smoker box 100 decreases. In this regard, the rate at which the smolder of the solid-form smoking materials propagates within the compartment 1002 of the smoker box 100 from the ignition zone 1308 of the first linear section 1302 to the transition zone 1310 of the elbow 1306 is greater than the rate at which the smolder of the solid-form smoking materials propagates within the compartment 1002 of the smoker box 100 from the transition zone 1310 of the elbow 1306 to the end zone 1312 of the second linear section 1304. The above-described decrease in propagation rate advantageously reduces the burn rate of the solid-form smoking materials, which in turn advantageously increases the duration of the smoking process. Increasing the duration of the smoking process in turn advantageously increases the degree to which flavor owed to the generated smoke is transferred and/or imparted to one or more food item(s) being cooked within a cookbox of a gas grill with which the smoker box 100 is being used.

The above-described decrease in propagation rate is made possible by the unique L-shaped profile of the base 102 of the smoker box 100, as well as the manner by which the base 102 of the smoker box 100 is sized in relation to a gas grill. In this regard, the base 102 of the smoker box 100 is configured such that, when positioned for use in a gas grill, the first linear section 1302 of the base 102 is oriented laterally (e.g., extending in a right-to-left direction) within a cookbox of the grill, and the second linear section 1304 of the base 102 is oriented depth-wise (e.g., extending in a front-to-rear direction) within the cookbox of the grill. The base 102 of the smoker box 100 is further configured such that the portion of the bottom wall 306 of the base 102 that forms the first linear section 1302 and the elbow 1306 of the base 102 can be placed into simultaneous contact with the respective tops of at least two neighboring grease deflection bars located within the cookbox of the grill. For example, the base 102 of the smoker box 100 is configured such that (1) the ignition zone 1308 of the first linear section 1302 of the base 102 is positioned over (e.g., above and in vertical alignment with) a first grease deflection bar located within the cookbox of the grill, (2) the transition zone 1310 of the elbow 1306 of the base 102 is positioned over a second grease deflection bar located within the cookbox of the grill, and (3) the end zone 1312 of the second linear section 1304 of the base 102 is positioned over the second grease deflection bar located within the cookbox of the grill.

In such an example, the first grease deflection bar of the grill is positioned over (e.g., above and in vertical alignment with) one of a plurality of burners of the grill, while the second grease deflection bar of the grill is not positioned over any of the plurality of burners of the grill. The base 102 of the smoker box 100 is accordingly configured such that the ignition zone 1308 of the first linear section 1302 of the base 102 is to be positioned over one of a plurality of burners of the grill, while the transition zone 1310 of the elbow 1306 of the base 102 and the end zone 1312 of the second linear section 1304 of the base 102 are not positioned over any of the plurality of burners of the grill. Locating the transition zone 1310 of the elbow 1306 of the base 102 and the end zone 1312 of the second linear section 1304 of the base 102 over a grease deflection bar that itself is not located over any of the plurality of burners of the grill advantageously slows the rate at which the smolder of the solid-form smoking materials propagates within the compartment 1002 of the smoker box 100 from the transition zone 1310 of the elbow 1306 to the end zone 1312 of the second linear section 1304.

Figure 14:
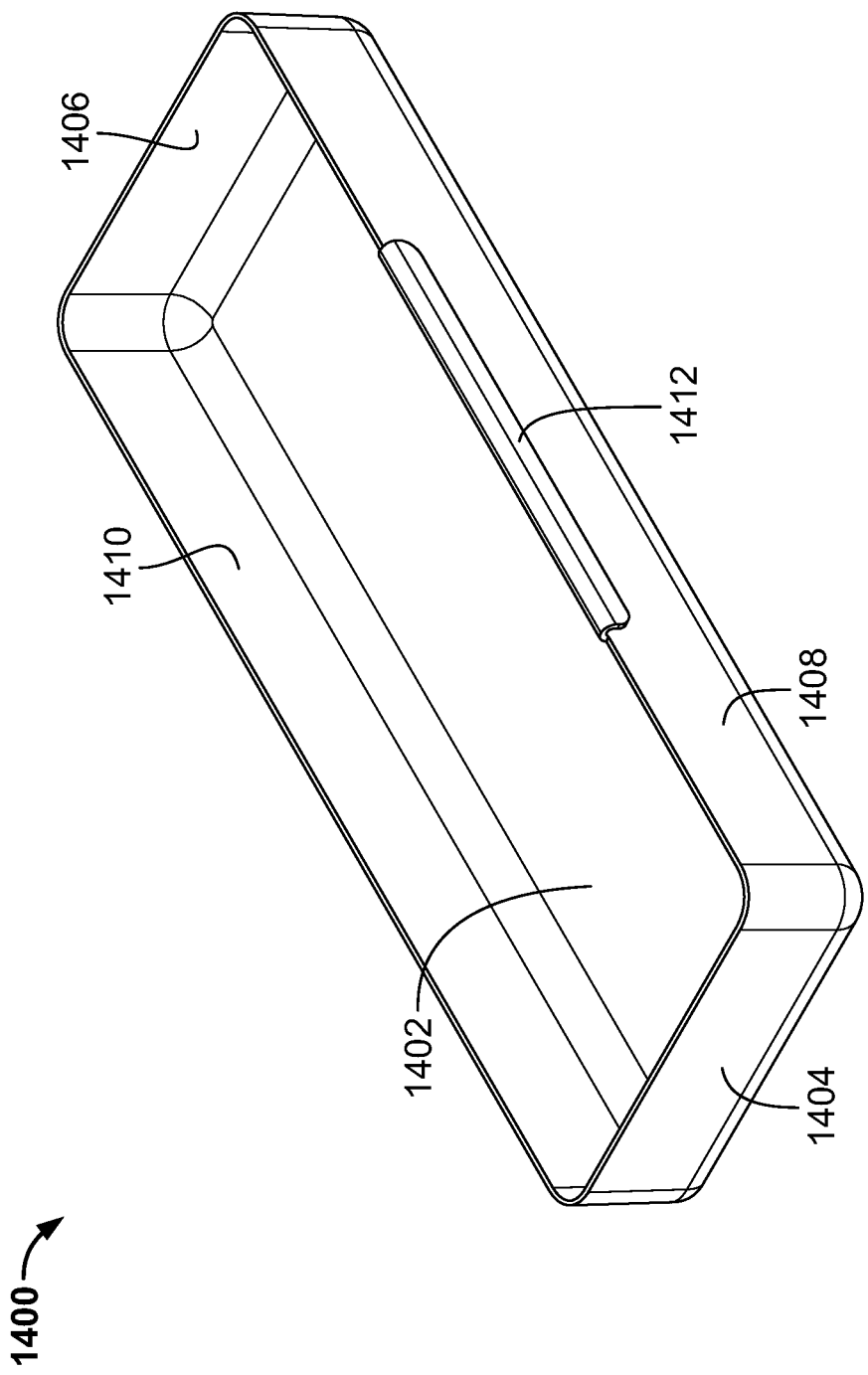
FIG. 14 is a perspective view of an example water pan constructed in accordance with teachings of this disclosure.
Figure 17:
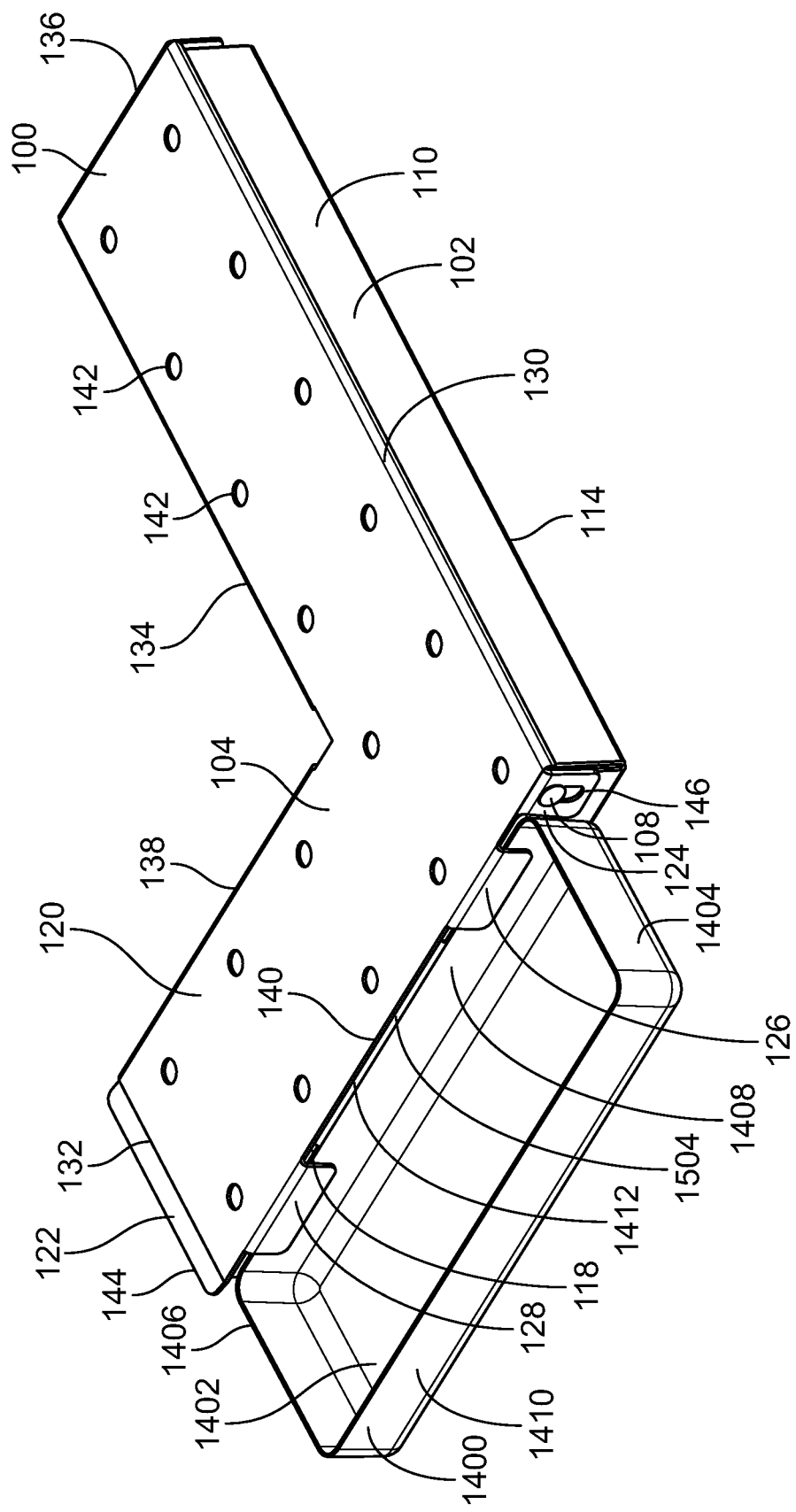
FIG. 17 is a first perspective view of the smoker box of FIGS. 1-12, with the water pan of FIGS. 14-16 coupled to the smoker box, and with the lid of the smoker box shown in the closed position of FIGS. 1-11.
Figure 18:
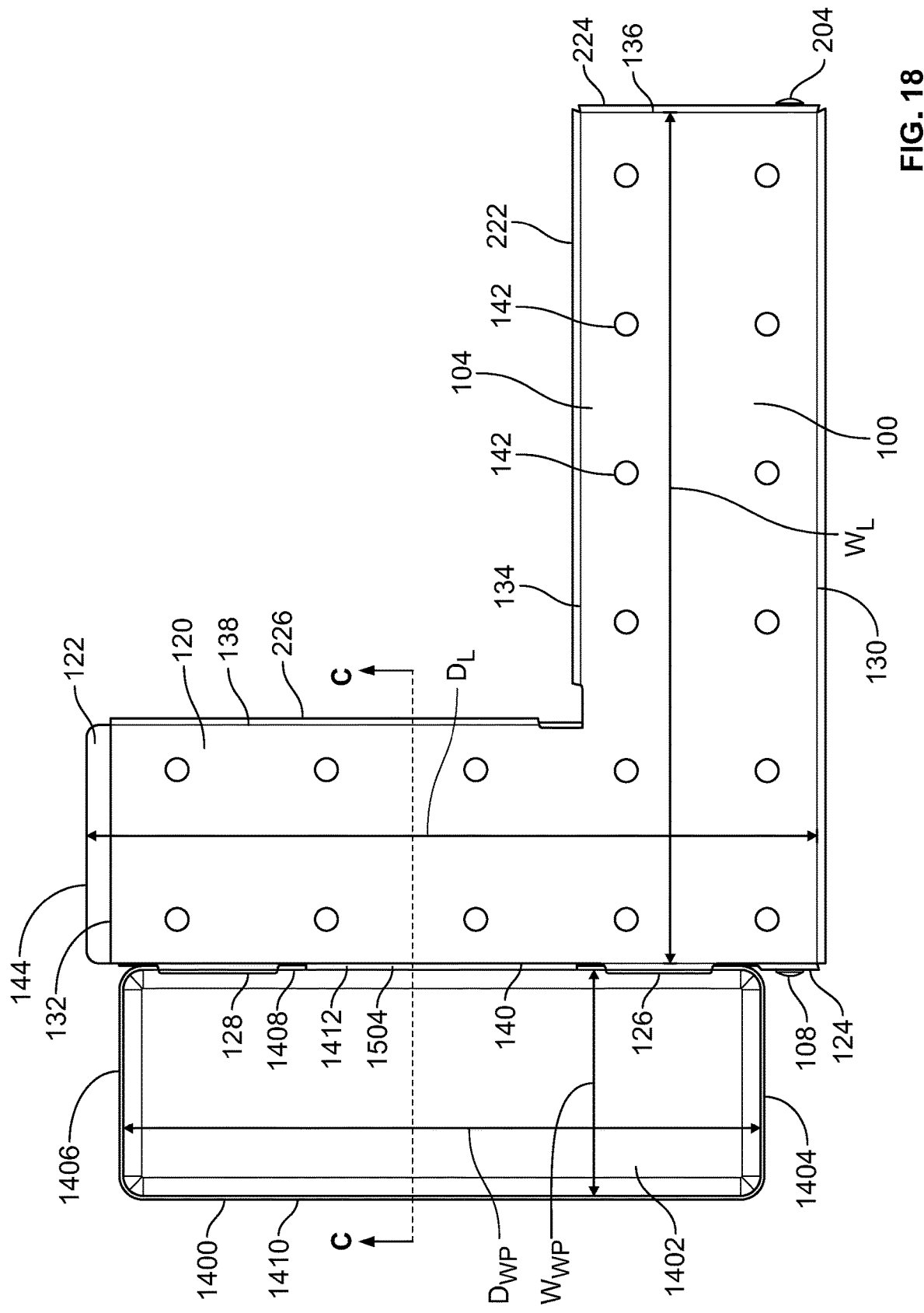
FIG. 18 is a top view of the smoker box of FIGS. 1-12 and 17, with the water pan of FIGS. 14-17 coupled to the smoker box, and with the lid of the smoker box shown in the closed position of FIGS. 1-11 and 17.
Figure 21:
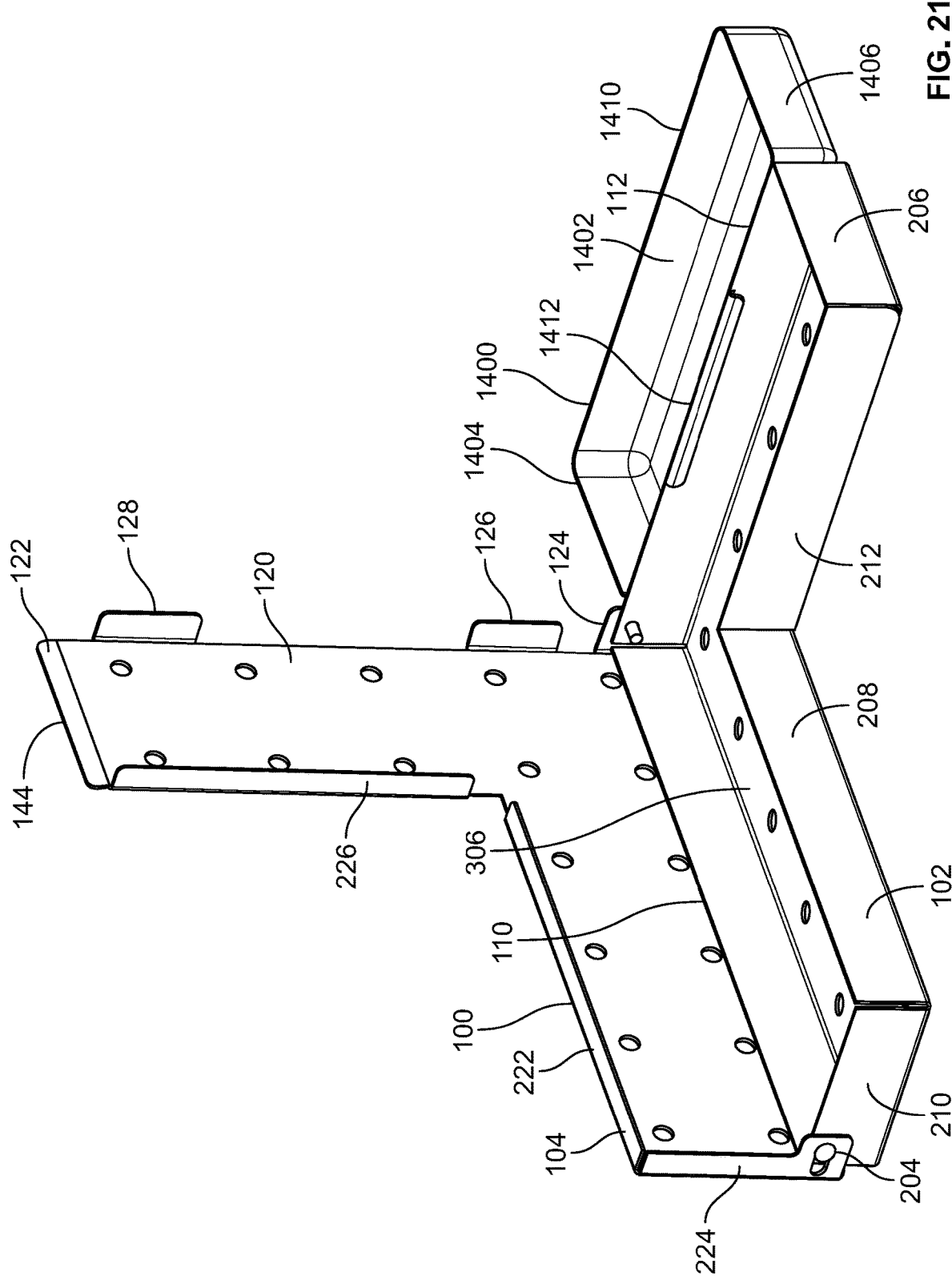
FIG. 21 is a second perspective view of the smoker box of FIGS. 1-12 and 17-20, with the water pan of FIGS. 14-20 coupled to the smoker box, and with the lid of the smoker box shown in the open position of FIG. 12.

FIG. 14 is a perspective view of an example water pan 1400 constructed in accordance with teachings of this disclosure. FIG. 15 is a front view of the water pan 1400 of FIG. 14. FIG. 16 is a right side view of the water pan 1400 of FIGS. 14 and 15. FIG. 17 is a first perspective view of the smoker box 100 of FIGS. 1-12, with the water pan 1400 of FIGS. 14-16 coupled to the smoker box 100, and with the lid 104 of the smoker box 100 shown in the closed position of FIGS. 1-11. FIG. 18 is a top view of the smoker box 100 of FIGS. 1-12 and 17, with the water pan 1400 of FIGS. 14-17 coupled to the smoker box 100, and with the lid 104 of the smoker box 100 shown in the closed position of FIGS. 1-11 and 17. FIG. 19 is a front view of the smoker box 100 of FIGS. 1-12, 17, and 18, with the water pan 1400 of FIGS. 14-18 coupled to the smoker box 100, and with the lid 104 of the smoker box 100 shown in the closed position of FIGS. 1-11, 17, and 18. FIG. 20 is a cross-sectional view taken along section C-C of FIG. 18 showing the smoker box 100 of FIGS. 1-12 and 17-19 and the water pan 1400 of FIGS. 14-19 coupled to one another, with the lid 104 of the smoker box 100 shown in the closed position of FIGS. 1-11 and 17-19. FIG. 21 is a second perspective view of the smoker box 100 of FIGS. 1-12 and 17-20, with the water pan 1400 of FIGS. 14-20 coupled to the smoker box 100, and with the lid 104 of the smoker box 100 shown in the open position of FIG. 12.

The water pan 1400 of FIGS. 14-21 is configured to be filled with and/or to hold fluid (e.g., water). Fluid held within the water pan 1400 advantageously produces humidity which further enhances the smoking process generated via the smoker box 100. In this regard, humidity produced from fluid held within the water pan 1400 enables smoke generated by and/or emanating from the smoker box 100 to better adhere to one or more food item(s) being cooked in a gas grill with which the smoker box 100 is being used. In the illustrated example of FIGS. 14-21, the water pan 1400 includes an example bottom wall 1402, an example front wall 1404, an example rear wall 1406 located opposite the front wall 1404, an example right sidewall 1408 extending between the front wall 1404 and the rear wall 1406, and an example left sidewall 1410 located opposite the right sidewall 1408 and extending between the front wall 1404 and the rear wall 1406. The front wall 1404, the rear wall 1406, the right sidewall 1408, and the left sidewall 1410 of the water pan 1400 respectively extend upwardly from the bottom wall 1402 of the water pan 1400.

As shown in FIGS. 14-21, the front wall 1404, the rear wall 1406, the right sidewall 1408, and the left sidewall 1410 of the water pan 1400 respectively extend upwardly from the bottom wall 1402 of the water pan 1400 at an orthogonal angle (e.g., an angle of 90 degrees). In other examples, one or more of the front wall 1404, the rear wall 1406, the right sidewall 1408, and/or the left sidewall 1410 of the water pan 1400 can instead extend upwardly from the bottom wall 1402 of the water pan 1400 at a non-orthogonal angle (e.g., at an angle greater than or less than 90 degrees). As shown in FIGS. 14-21, the bottom wall 1402, the front wall 1404, the rear wall 1406, the right sidewall 1408, and the left sidewall 1410 of the water pan 1400 respectively have a generally rectangular profile. In other examples, one or more of the bottom wall 1402, the front wall 1404, the rear wall 1406, the right sidewall 1408, and/or the left sidewall 1410 of the water pan 1400 can instead have a non-rectangular rectangular profile (e.g., a triangular profile, a trapezoidal profile, a hexagonal profile, etc.).

The water pan 1400 of FIGS. 14-21 further includes an example hook 1412 that is configured to couple the water pan 1400 to the smoker box 100. In the illustrated example of FIGS. 14-21, the hook 1412 of the water pan 1400 includes an example first portion 1502 that extends upwardly from the right sidewall 1408 of the water pan 1400, an example second portion 1504 that extends outwardly from the first portion 1502 (e.g., away from the right sidewall 1408 of the water pan 1400), and an example third portion 1506 that extends downwardly from the second portion 1504 (e.g., toward the bottom wall 1402 of the water pan 1400), thereby forming an example downwardly-facing recess 1508. The hook 1412 of the water pan 1400 is configured to mate with and/or engage the left sidewall 112 of the base 102 of the smoker box 100 such that (1) the first portion 1502 of the hook 1412 and/or an exterior surface of the right sidewall 1408 of the water pan 1400 is/are located adjacent (e.g., in a contacting relationship with) an exterior surface of the left sidewall 112 of the base 102, (2) the second portion 1504 of the hook 1412 extends over and/or through the channel 118 formed in the left sidewall 112 of the base 102, (3) the third portion 1506 of the hook 1412 is located adjacent (e.g., in a contacting relationship with) an interior surface of the left sidewall 112 of the base 102, and (4) the portion of the left sidewall 112 of the base 102 located below the channel 118 formed in the left sidewall 112 of the base 102 is received in the downwardly-facing recess 1508 of the hook 1412.

The water pan 1400 of FIGS. 14-21 is configured to become coupled to and/or to become uncoupled from the smoker box 100 when the lid 104 of the smoker box 100 is in the in the open position shown in FIGS. 12 and 21. Transitioning the lid 104 from the open position shown in FIGS. 12 and 21 into the closed position shown in FIGS. 1-11 and 17-20 with the water pan 1400 already coupled to the smoker box 100 facilitates the engagement of one or more additional coupling mechanism(s). In this regard, when the water pan 1400 is coupled to the smoker box 100 and the lid 104 of the smoker box 100 thereafter becomes closed, (1) the left edge 140 of the top wall 120 of the lid 104 is located adjacent (e.g., in a contacting relationship with) the second portion 1504 of the hook 1412 of the water pan 1400, (2) the second left flange 126 of the lid 104 is located adjacent (e.g., in a contacting relationship with) an interior surface of the right sidewall 1408 of the water pan 1400, and (3) the third left flange 128 of the lid 104 is located adjacent (e.g., in a contacting relationship with) the interior surface of the right sidewall 1408 of the water pan 1400.

The water pan 1400 of FIGS. 14-21 has a depth ($D_{WP}$) extending from the front wall 1404 of the water pan 1400 to the rear wall 1406 of the water pan 1400, and a width ($W_{WP}$) extending from the right sidewall 1408 of the water pan 1400 to the left sidewall 1410 of the water pan 1400. In the illustrated example of FIGS. 14-21, the water pan 1400 is configured such that the depth ($D_{WP}$) of the water pan 1400 exceeds the width ($W_{WP}$) of the water pan 1400. In other examples, the water pan 1400 can instead be configured such that the width ($W_{WP}$) of the water pan 1400 is greater than or equal to the depth ($D_{WP}$) of the water pan 1400. In the illustrated example of FIGS. 14-21, the water pan 1400 is configured such that the depth ($D_{WP}$) of the water pan 1400 is substantially the same as (e.g., at least 90% of) the depth ($D_B$) of the base 102 of the smoker box 100, and/or substantially the same as (e.g., at least 90% of) the depth ($D_L$) of the lid 104 of the smoker box 100.

Figure 22:
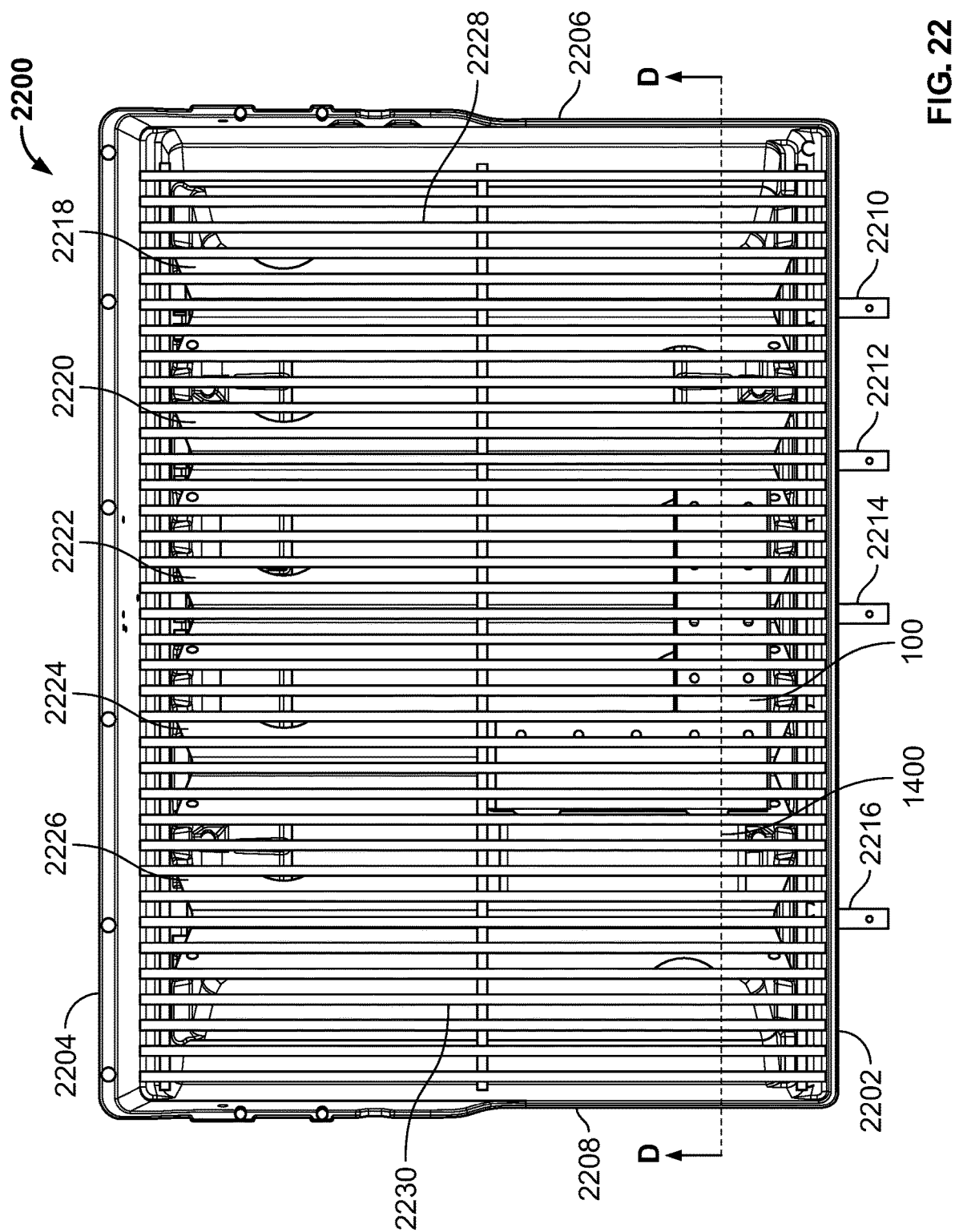
FIG. 22 is a top view of the smoker box of FIGS. 1-12 and 17-21 and the water pan of FIGS. 14-21 shown coupled to one another and positioned within an example cookbox of a gas grill, with the lid of the smoker box shown in the closed position of FIGS. 1-11 and 17-20.

FIG. 22 is a top view of the smoker box of FIGS. 1-12 and 17-21 and the water pan of FIGS. 14-21 shown coupled to one another and positioned within an example cookbox of an example gas grill, with the lid of the smoker box shown in the closed position of FIGS. 1-11 and 17-20.

Figure 23:
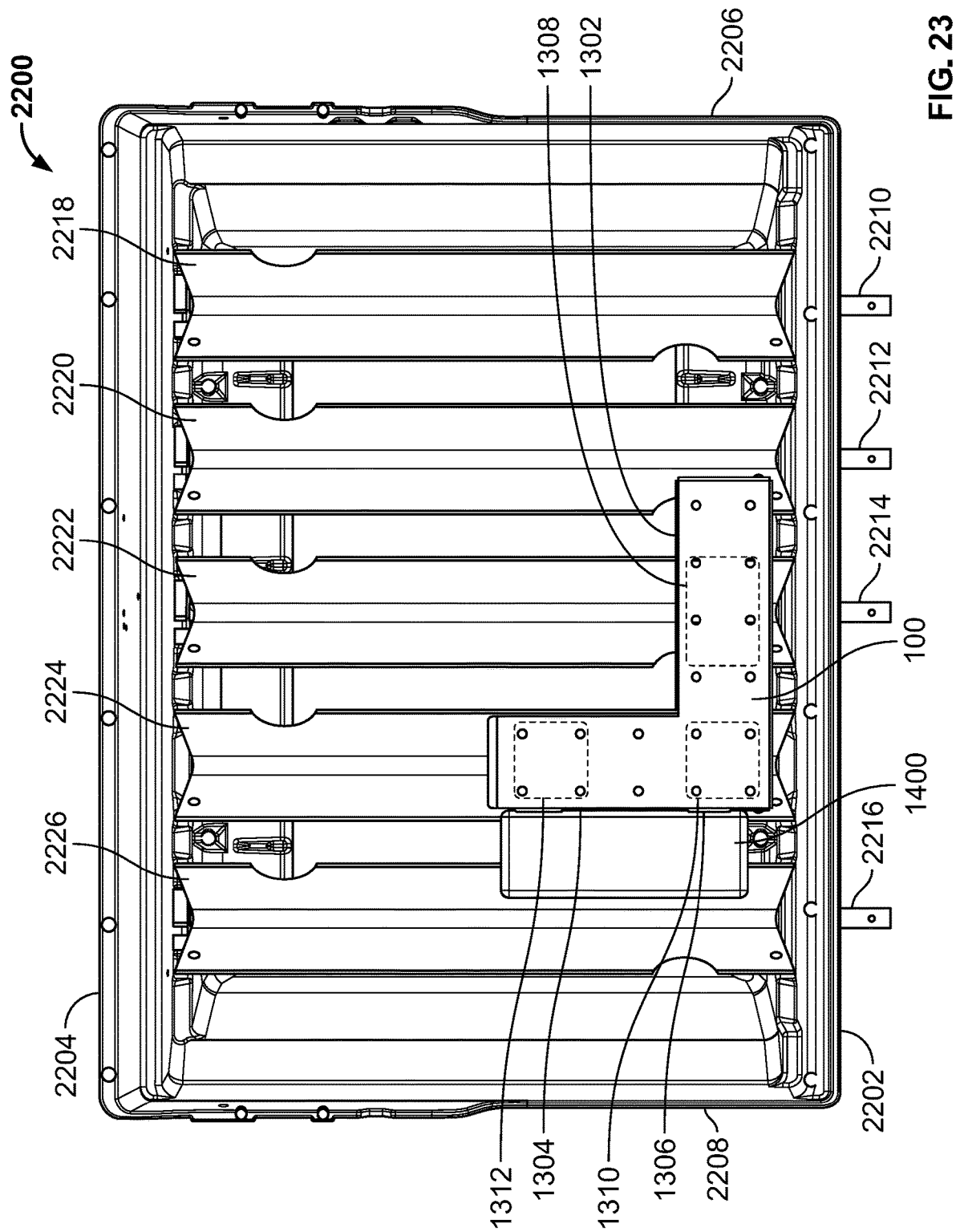
FIG. 23 is a top view of the smoker box of FIGS. 1-12 and 17-22 and the water pan of FIGS. 14-22 shown coupled to one another and positioned within the cookbox of FIG. 22, with the lid of the smoker box shown in the closed position of FIGS. 1-11, 17-20, and 22, and with one or more example cooking grate(s) removed from the cookbox.

FIG. 23 is a top view of the smoker box of FIGS. 1-12 and 17-22 and the water pan of FIGS. 14-22 shown coupled to one another and positioned within the cookbox of the gas grill of FIG. 22, with the lid of the smoker box shown in the closed position of FIGS. 1-11, 17-20, and 22, and with one or more example cooking grate(s) removed from the gas grill.

Figure 24:
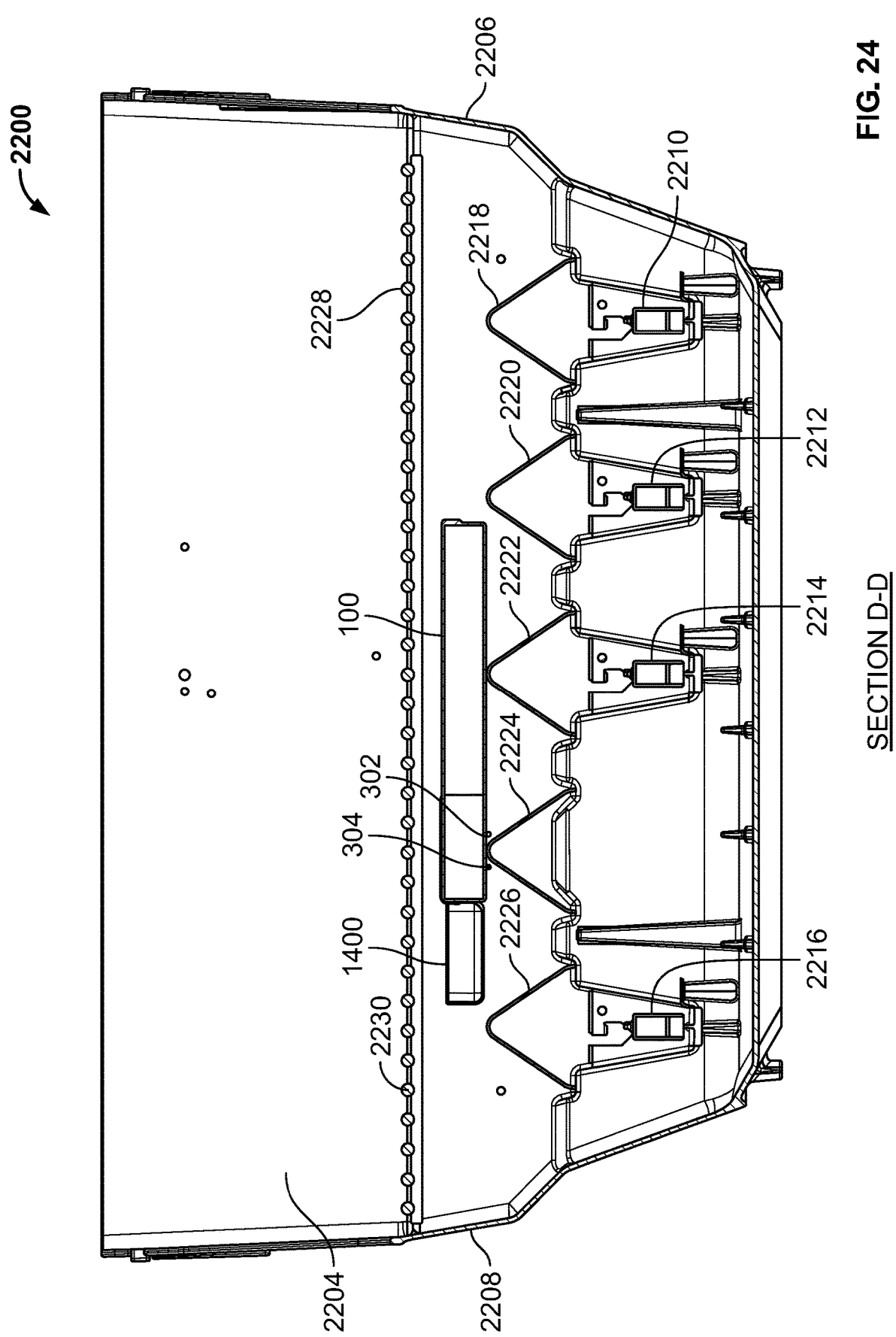
FIG. 24 is a cross-sectional view taken along section D-D of FIG. 22 showing the smoker box of FIGS. 1-12 and 17-23 and the water pan of FIGS. 14-23 coupled to one another and positioned within the cookbox of FIGS. 22 and 23, with the lid of the smoker box shown in the closed position of FIGS. 1-11, 17-20, 22, and 23.

FIG. 24 is a cross-sectional view taken along section D-D of FIG. 22 showing the smoker box of FIGS. 1-12 and 17-23 and the water pan of FIGS. 14-23 coupled to one another and positioned within the cookbox of the gas grill of FIGS. 22 and 23, with the lid of the smoker box shown in the closed position of FIGS. 1-11, 17-20, 22, and 23.

FIG. 22 is a top view of the smoker box 100 of FIGS. 1-12 and 17-21 and the water pan 1400 of FIGS. 14-21 shown coupled to one another and positioned within an example cookbox 2200 of a gas grill, with the lid 104 of the smoker box 100 shown in the closed position of FIGS. 1-11 and 17-20. FIG. 23 is a top view of the smoker box 100 of FIGS. 1-12 and 17-22 and the water pan 1400 of FIGS. 14-22 shown coupled to one another and positioned within the cookbox 2200 of FIG. 22, with the lid 104 of the smoker box 100 shown in the closed position of FIGS. 1-11, 17-20, and 22, and with one or more example cooking grate(s) removed from the cookbox 2200. FIG. 24 is a cross-sectional view taken along section D-D of FIG. 22 showing the smoker box 100 of FIGS. 1-12 and 17-23 and the water pan 1400 of FIGS. 14-23 coupled to one another and positioned within the cookbox 2200 of FIGS. 22 and 23, with the lid 104 of the smoker box 100 shown in the closed position of FIGS. 1-11, 17-20, 22, and 23.

The cookbox 2200 of FIGS. 22-24 includes an example front wall 2202, an example rear wall 2204 located opposite the front wall 2202, an example right sidewall 2206 extending between the front wall 2202 and the rear wall 2204, and an example left sidewall 2208 located opposite the right sidewall 2206 and extending between the front wall 2202 and the rear wall 2204. In the illustrated example of FIGS. 22-24, the cookbox 2200 carries, supports, contains, houses, and/or otherwise includes an example first burner 2210, an example second burner 2212, an example third burner 2214, and an example fourth burner 2216. In other examples, the cookbox 2200 can instead carry, support, contain, house, and/or otherwise include a different number (e.g., 1, 2, 3, 5, etc.) of burners. The first burner 2210, the second burner 2212, the third burner 2214, and the fourth burner 2216 are respectively configured to generate and/or emit heat-producing gas flames. In the illustrated example of FIGS. 22-24, the first burner 2210, the second burner 2212, the third burner 2214, and the fourth burner 2216 are linear burners that are respectively spaced apart from one another in a parallel, neighboring relationship, and arranged within the cookbox 2200 in a front-to rear-orientation (e.g., extending between the front wall 2202 and the rear wall 2204 of the cookbox 2200). As further shown in FIGS. 22-24, the first burner 2210, the second burner 2212, the third burner 2214, and the fourth burner 2216 are respectively positioned at the same height within the cookbox 2200.

The cookbox 2200 of FIGS. 22-24 also carries, supports, contains, houses, and/or otherwise includes an example first grease deflection bar 2218, an example second grease deflection bar 2220, an example third grease deflection bar 2222, an example fourth grease deflection bar 2224, and an example fifth grease deflection bar 2226. In other examples, the cookbox 2200 can instead carry, support, contain, house, and/or otherwise include a different number (e.g., 1, 2, 3, 4, etc.) of grease deflection bars. The first grease deflection bar 2218, the second grease deflection bar 2220, the third grease deflection bar 2222, the fourth grease deflection bar 2224, and the fifth grease deflection bar 2226 are respectively configured to have an inverted V-shaped profile. As one or more food item(s) is/are cooked within the cookbox 2200, grease produced by the cooking food item(s) falls downward onto the first grease deflection bar 2218, the second grease deflection bar 2220, the third grease deflection bar 2222, the fourth grease deflection bar 2224, and/or the fifth grease deflection bar 2226. The inverted V-shaped profile of each such grease deflection bar directs such grease to a further downward location within the cookbox 2200, while in some instances also shielding an underlying one of the aforementioned burners of the cookbox 2200 (e.g., the first burner 2210, the second burner 2212, the third burner 2214, or the fourth burner 2216) from being exposed to such grease.

In the illustrated example of FIGS. 22-24, the first grease deflection bar 2218, the second grease deflection bar 2220, the third grease deflection bar 2222, the fourth grease deflection bar 2224, and the fifth grease deflection bar 2226 are respectively spaced apart from one another in a parallel, neighboring relationship, and arranged within the cookbox 2200 in a front-to rear-orientation (e.g., extending between the front wall 2202 and the rear wall 2204 of the cookbox 2200). As shown in FIGS. 22-24, the first grease deflection bar 2218, the second grease deflection bar 2220, the third grease deflection bar 2222, the fourth grease deflection bar 2224, and the fifth grease deflection bar 2226 are respectively positioned at the same height within the cookbox 2200, with said height being above the height at which the first burner 2210, the second burner 2212, the third burner 2214, and the fourth burner 2216 are respectively positioned within the cookbox 2200. As further shown in FIGS. 22-24, the first grease deflection bar 2218 is positioned over (e.g., above and in vertical alignment with) the first burner 2210, the second grease deflection bar 2220 is positioned over the second burner 2212, the third grease deflection bar 2222 is positioned over the third burner 2214, the fourth grease deflection bar 2224 is not positioned over any burner, and the fifth grease deflection bar 2226 is positioned over the fourth burner 2216.

The cookbox 2200 of FIGS. 22-24 also carries, supports, contains, houses, and/or otherwise includes an example first cooking grate 2228 and an example second cooking grate 2230. In other examples, the cookbox 2200 can instead carry, support, contain, house, and/or otherwise include a different number (e.g., 1, 3, etc.) of cooking grates. The first cooking grate 2228 and the second cooking grate 2230 are collectively configured to form and/or define a substantially flat, planar cooking surface for cooking one or more food item(s) placed thereon. As shown in FIGS. 22-24, the first cooking grate 2228 and the second cooking grate 2230 are collectively configured to fill, cover, and/or occupy the substantial entirety of the horizontal form factor and/or footprint of the cookbox 2200 (e.g., as defined by the width and the depth of the cookbox 2200). In other examples, the first cooking grate 2228 and the second cooking grate 2230 can instead be collectively configured to fill, cover, and/or occupy a relatively smaller portion and/or percentage (e.g., less than the substantial entirety) of the horizontal form factor and/or footprint of the cookbox 2200. In the illustrated example of FIGS. 22-24, the first cooking grate 2228 and the second cooking grate 2230 are respectively positioned at the same height within the cookbox 2200, with said height being above the height at which the first grease deflection bar 2218, the second grease deflection bar 2220, the third grease deflection bar 2222, the fourth grease deflection bar 2224, and the fifth grease deflection bar 2226 are respectively positioned within the cookbox 2200.

In the illustrated example of FIGS. 22-24, the smoker box 100 and the attached water pan 1400 are located within the cookbox 2200 proximate the front wall 2202 of the cookbox 2200, with the smoker box 100 and the attached water pan 1400 being located above the grease deflection bars (e.g., above each of the first grease deflection bar 2218, the second grease deflection bar 2220, the third grease deflection bar 2222, the fourth grease deflection bar 2224, and the fifth grease deflection bar 2226) and below the cooking grates (e.g., below each of the first cooking grate 2228 and the second cooking grate 2230), and with the base 102 (e.g., the bottom wall 306 of the base 102) of the smoker box 100 contacting the respective top portions of the third grease deflection bar 2222 and the fourth grease deflection bar 2224. In this regard, the smoker box 100 is positioned within the cookbox 2200 such that (1) the first linear section 1302 of the base 102 of the smoker box 100 extends laterally from the third grease deflection bar 2222 toward the fourth grease deflection bar 2224, (2) the elbow 1306 of the base 102 of the smoker box 100 is located over the fourth grease deflection bar 2224, and (3) the second linear section 1304 of the base 102 of the smoker box 100 extends rearwardly from the elbow 1306 of the base 102 of the smoker box 100 in a direction running along the depth of the fourth grease deflection bar 2224. As shown in FIG. 24, the first positioning rod 302 of the smoker box 100 is located on one side of an apex of the fourth grease deflection bar 2224, and the second positioning rod 304 of the smoker box 100 is located on the opposing side of the apex of the fourth grease deflection bar 2224. The first positioning rod 302 and the second positioning rod 304 accordingly assist in locating the bottom wall 306 and/or, more generally, the base 102 of the smoker box 100 on the fourth grease deflection bar 2224, which in turn assists in locating the smoker box 100 as a whole at a preferred location within the cookbox 2200.

When the base 102 of the smoker box 100 is positioned within the cookbox 2200 as shown in FIGS. 22-24, the ignition zone 1308 of the first linear section 1302 of the base 102 is positioned over (e.g., above and in vertical alignment with) the third grease deflection bar 2222, the transition zone 1310 of the elbow 1306 of the base 102 is positioned over the fourth grease deflection bar 2224, and the end zone 1312 of the second linear section 1304 of the base 102 is positioned over the fourth grease deflection bar 2224. Furthermore, the ignition zone 1308 of the first linear section 1302 of the base 102 is positioned over (e.g., above and in vertical alignment with) the third burner 2214, while the transition zone 1310 of the elbow 1306 of the base 102 and the end zone 1312 of the second linear section 1304 of the base 102 are not positioned over any of the plurality of burners located within the cookbox 2200.

Locating the transition zone 1310 of the elbow 1306 of the base 102 and the end zone 1312 of the second linear section 1304 of the base 102 over (e.g., above and in vertical alignment with) the fourth grease deflection bar 2224, which is not itself located over any of the plurality of burners of the cookbox 2200, advantageously slows the rate at which a smolder of solid-form smoking materials propagates within the compartment 1002 of the smoker box 100 from the transition zone 1310 of the elbow 1306 to the end zone 1312 of the second linear section 1304 relative to a rate at which the smolder of the solid-form smoking materials propagates within the compartment 1002 of the smoker box 100 from the ignition zone 1308 of the first linear section 1302 to the transition zone 1310 of the elbow 1306. The decrease in propagation rate advantageously reduces the burn rate of the solid-form smoking materials, which in turn advantageously increases the duration of the smoking process. Increasing the duration of the smoking process in turn advantageously increases the degree to which flavor owed to the generated smoke is transferred and/or imparted to one or more food item(s) being cooked within the cookbox 2200 (e.g., on the first cooking grate 2228 or the second cooking grate 2230) of the grill.

Example L-shaped smoker boxes are disclosed. In some disclosed examples, a smoker box comprises a base and a lid. The base includes a bottom wall having an L-shaped profile. The lid includes a top wall having an L-shaped profile.

In some disclosed examples, the base includes a first linear section, a second linear section extending orthogonally from the first linear section, and an elbow located between and joining the first linear section and the second linear section.

In some disclosed examples, the first linear section includes an ignition zone, the elbow includes a transition zone, and the second linear section includes an end zone.

In some disclosed examples, the transition zone is configured to reduce a rate of propagation of a smolder of solid-form smoking materials as the smolder progresses from the ignition zone to the end zone.

In some disclosed examples, the bottom wall has a width configured to extend between a first grease deflection bar and a second grease deflection bar. The first grease deflection bar and the second grease deflection bar are respectively located within a cookbox of a grill. The second grease deflection bar is spaced apart from and oriented parallel to the first grease deflection bar. The first grease deflection bar is positioned over one of a plurality of burners located within the cookbox of the grill. The second grease deflection bar is not positioned over any of the plurality of burners located within the cookbox of the grill.

In some disclosed examples, the bottom wall is configured such that the ignition zone is to be located over the first grease deflection bar, the transition zone is to be located over the second grease deflection bar, and the end zone is to be located over the second grease deflection bar.

In some disclosed examples, the L-shaped profile of the top wall corresponds to the L-shaped profile of the bottom wall.

In some disclosed examples, the bottom wall includes a plurality of openings extending through the bottom wall, and the top wall includes a plurality of openings extending through the top wall.

In some disclosed examples, the lid is rotatably coupled to the base and movable between a closed position and an open position.

In some disclosed examples, the base defines a compartment. The lid covers the compartment when the lid is in the closed position. The lid exposes the compartment when the lid is in the open position.

In some disclosed examples, the smoker box further comprises a first hinge and a second hinge. The second hinge is coaxially aligned with the first hinge. The first hinge and the second hinge are configured to rotatably couple the lid to the base.

In some disclosed examples, the smoker box further comprises a first positioning rod and a second positioning rod. The first positioning rod and the second positioning rod are respectively coupled to an underside of the bottom wall. The second positioning rod is spaced apart from and oriented parallel to the first positioning rod.

In some disclosed examples, the first positioning rod and the second positioning rod are configured to assist in locating the base of the smoker box on a grease deflection bar located within a cookbox of a grill.

In some disclosed examples, the base further includes a front wall extending upwardly from the bottom wall. In some disclosed examples, the base further includes a first rear wall located opposite the front wall and extending upwardly from the bottom wall. In some disclosed examples, the base further includes a second rear wall located opposite the front wall and extending upwardly from the bottom wall. The second rear wall is located between the front wall and the first rear wall. In some disclosed examples, the base further includes a left sidewall extending upwardly from the bottom wall. In some disclosed examples, the base further includes a first right sidewall located opposite the left sidewall and extending upwardly from the bottom wall. In some disclosed examples, the base further includes a second right sidewall located opposite the left sidewall and extending upwardly from the bottom wall. The second right sidewall is located between the left sidewall and the first right sidewall.

In some disclosed examples, the left sidewall includes a channel configured to receive a hook of a water pan.

In some disclosed examples, the hook of the water pan extends through or over the channel of the left sidewall to couple the water pan to the base.

In some disclosed examples, a portion of the hook is adjacent an interior surface of the left sidewall when the water pan is coupled to the base.

In some disclosed examples, the lid is positioned over the hook when the water pan is coupled to the base and the lid is in a closed position relative to the base.

In some disclosed examples, the lid includes a left flange extending downwardly from the top wall.

In some disclosed examples, the left flange is adjacent an interior surface of a right sidewall of the water pan when the water pan is coupled to the base and the lid is in the closed position relative to the base.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A smoker box, comprising:
a base including:
 a bottom wall having an L-shaped profile;
 a first linear section including an ignition zone;
 a second linear section extending orthogonally from the first linear section, the second linear section including an end zone; and
 an elbow located between and joining the first linear section and the second linear section, the elbow including a transition zone;
 wherein the bottom wall has a width configured to extend between a first grease deflection bar and a second grease deflection bar respectively located within a cookbox of a grill, the second grease deflection bar spaced apart from and oriented parallel to the first grease deflection bar, wherein the bottom wall is configured such that the ignition zone is to be located over the first grease deflection bar, the transition zone is to be located over the second grease deflection bar, and the end zone is to be located over the second grease deflection bar; and
a lid including a top wall, the top wall having an L-shaped profile.

2. The smoker box of claim 1, wherein the transition zone is configured to reduce a rate of propagation of a smolder of solid-form smoking materials as the smolder progresses from the ignition zone to the end zone.

3. The smoker box of claim 1, wherein the first grease deflection bar is positioned over one of a plurality of burners located within the cookbox of the grill, and the second grease deflection bar is not positioned over any of the plurality of burners located within the cookbox of the grill.

4. The smoker box of claim 1, wherein the L-shaped profile of the top wall corresponds to the L-shaped profile of the bottom wall.

5. The smoker box of claim 1, wherein the bottom wall includes a plurality of openings extending through the bottom wall, and the top wall includes a plurality of openings extending through the top wall.

6. The smoker box of claim 1, wherein the lid is rotatably coupled to the base and movable between a closed position and an open position.

7. The smoker box of claim 6, wherein the base defines a compartment, the lid covering the compartment when the lid is in the closed position, the lid exposing the compartment when the lid is in the open position.

8. The smoker box of claim 6, further comprising a first hinge and a second hinge, the second hinge coaxially aligned with the first hinge, the first hinge and the second hinge configured to rotatably couple the lid to the base.

9. The smoker box of claim 1, further comprising a first positioning rod and a second positioning rod, the first positioning rod and the second positioning rod respectively coupled to an underside of the bottom wall, the second positioning rod spaced apart from and oriented parallel to the first positioning rod.

10. The smoker box of claim 9, wherein the first positioning rod and the second positioning rod are configured to assist in locating the base of the smoker box on the second grease deflection bar.

11. A smoker box, comprising:
a base including:
 a bottom wall having an L-shaped profile;
 a front wall extending upwardly from the bottom wall;
 a first rear wall located opposite the front wall and extending upwardly from the bottom wall;
 a second rear wall located opposite the front wall and extending upwardly from the bottom wall, the second rear wall located between the front wall and the first rear wall;
 a left sidewall extending upwardly from the bottom wall;
 a first right sidewall located opposite the left sidewall and extending upwardly from the bottom wall; and
 a second right sidewall located opposite the left sidewall and extending upwardly from the bottom wall, the second right sidewall located between the left sidewall and the first right sidewall; and
a lid including a top wall, the top wall having an L-shaped profile.

12. The smoker box of claim 11, wherein the left sidewall includes a channel configured to receive a hook of a water pan.

13. The smoker box of claim 12, wherein the hook of the water pan extends through or over the channel of the left sidewall to couple the water pan to the base.

14. The smoker box of claim 13, wherein a portion of the hook is adjacent an interior surface of the left sidewall when the water pan is coupled to the base.

15. The smoker box of claim 13, wherein the lid is positioned over the hook when the water pan is coupled to the base and the lid is in a closed position relative to the base.

16. The smoker box of claim 15, wherein the lid includes a left flange extending downwardly from the top wall.

17. The smoker box of claim 16, wherein the left flange is adjacent an interior surface of a right sidewall of the water pan when the water pan is coupled to the base and the lid is in the closed position relative to the base.

18. A smoker box, comprising:
a base including:
 a bottom wall having a flat L-shaped profile when viewed from a top side of the bottom wall; and
 a sidewall extending upwardly from the bottom wall, the sidewall including a channel configured to receive a hook of a water pan, wherein the hook of the water pan is configured to extend through or over the channel of the sidewall to couple the water pan to the base, wherein a first portion of the hook is configured to be located adjacent an interior surface of the sidewall and a second portion of the hook is configured to be located adjacent an exterior surface of the sidewall when the water pan is coupled to the base; and
a lid rotatably coupled to the base and movable between a closed position and an open position, the lid including a top wall having a flat L-shaped profile when viewed from a top side of the top wall, wherein the flat L-shaped profile of the top wall corresponds to the flat L-shaped profile of the bottom wall, wherein the lid is positioned over the hook when the water pan is coupled to the base and the lid is in the closed position.

19. The smoker box of claim 18, wherein the sidewall is a left sidewall of the base, the base further including:
a front wall extending upwardly from the bottom wall;
a first rear wall located opposite the front wall and extending upwardly from the bottom wall;

a second rear wall located opposite the front wall and extending upwardly from the bottom wall, the second rear wall located between the front wall and the first rear wall;

a first right sidewall located opposite the left sidewall and extending upwardly from the bottom wall; and a second right sidewall located opposite the left sidewall and extending upwardly from the bottom wall, the second right sidewall located between the left sidewall and the first right sidewall.

20. The smoker box of claim 18, wherein the base further includes:

a first linear section including an ignition zone;

a second linear section extending orthogonally from the first linear section, the second linear section including an end zone; and an elbow located between and joining the first linear section and the second linear section, the elbow including a transition zone;

wherein the bottom wall has a width configured to extend between a first grease deflection bar and a second grease deflection bar respectively located within a cookbox of a grill, the second grease deflection bar spaced apart from and oriented parallel to the first grease deflection bar, wherein the bottom wall is configured such that the ignition zone is to be located over the first grease deflection bar, the transition zone is to be located over the second grease deflection bar, and the end zone is to be located over the second grease deflection bar.

* * * * *